United States Patent
Ackland et al.

(10) Patent No.: US 8,072,525 B1
(45) Date of Patent: Dec. 6, 2011

(54) IMAGING SIGNAL PROCESSING METHODS AND APPARATUS

(75) Inventors: Bryan D. Ackland, Old Bridge, NJ (US); Paul W. Latham, II, Lee, NH (US); Joshua C. Park, Billerica, MA (US)

(73) Assignee: Infrared Newco, Inc., Tucson, AZ (US)

( * ) Notice: Subject to any disclaimer, the term of this patent is extended or adjusted under 35 U.S.C. 154(b) by 831 days.

(21) Appl. No.: 12/141,542

(22) Filed: Jun. 18, 2008

(51) Int. Cl.
*H04N 5/335* (2011.01)

(52) U.S. Cl. .......... 348/308; 348/294; 348/302

(58) Field of Classification Search .......... 348/294, 348/302–308; 250/208.1
See application file for complete search history.

(56) References Cited

U.S. PATENT DOCUMENTS

| | | | |
|---|---|---|---|
| 4,287,441 A | 9/1981 | Smith | |
| 5,086,344 A | 2/1992 | D'Luna et al. | |
| 5,754,056 A | 5/1998 | Sauer | |
| 5,877,715 A | 3/1999 | Gowda et al. | |
| 5,920,199 A | 7/1999 | Sauer | |
| 6,115,066 A | 9/2000 | Gowda et al. | |
| 6,180,942 B1 | 1/2001 | Tracy et al. | |
| 6,369,853 B1 * | 4/2002 | Merrill et al. | 348/302 |
| 6,421,085 B1 | 7/2002 | Xu et al. | |
| 6,727,486 B2 | 4/2004 | Choi | |
| 6,753,912 B1 | 6/2004 | Wayne | |
| 2005/0046715 A1 | 3/2005 | Lim et al. | |

FOREIGN PATENT DOCUMENTS

WO WO 97/39474 A1 10/1997

OTHER PUBLICATIONS

Colace et al., "A Near-Infrared Digital Camera in Polycrystalline Germanium Integrated on Silicon," *IEEE Journal of Quantum Electronics*, 43:4, 311-315 (2007).
Holst et al., "CMOS/CCD Sensors and Camera Systems," *JCD Publishing*, pp. 86-109 (2007).

* cited by examiner

*Primary Examiner* — Darryl J Collins
(74) *Attorney, Agent, or Firm* — Wolf, Greenfield & Sacks, P.C.

(57) ABSTRACT

Methods and apparatus are provided for performing multiple correlated double sampling (CDS) operations on an imaging pixel, and in some cases on an array of imaging pixels, during a single integration cycle of the pixel(s). The multiple CDS operations may produce multiple CDS values, which may be processed in combination to produce a resulting value substantially free of various types of noise. The CDS operations may be performed using a CDS circuit including a single-ended charge amplifier having an input capacitor. The charge amplifier may also include a variable capacitance providing a variable gain. The variable capacitance may be provided by a feedback capacitor.

33 Claims, 10 Drawing Sheets

IMAGING SIGNAL PROCESSING METHODS AND APPARATUS

BACKGROUND

1. Field

The technology described herein relates to processing signals of imaging pixels.

2. Related Art

Conventional imagers typically include an array of active pixels. FIG. 1 is a circuit schematic of a conventional complementary metal oxide semiconductor (CMOS) imaging pixel 100, referred to as a 3T imaging pixel because it includes three transistors T1, T2, and T3. The imaging pixel 100 includes photodetector 102 which generates an optical current (photocurrent) in response to detecting incident radiation. The optical current is accumulated, or integrated, on integration node 104 to generate a voltage. The voltage on the integration node 104 is maintained by an effective capacitance $C_{int}$ (shown in phantom), which is the effective capacitance to ground at node 104, and which includes the photodetector capacitance, the gate capacitance of transistor T2, and any stray wiring capacitance.

The voltage on integration node 104 is read out of imaging pixel 100 as the pixel output signal by turning on the transistor T3, which connects the source of transistor T2 to a column line 106. The column line 106 connects all pixels in a single column of an array containing imaging pixel 100, and terminates on a load device (not shown) in the column circuitry at the bottom (or top) of the array. To reset the voltage of integration node 104, precharge transistor T1 is turned on. To start a new integration period, precharge transistor T1 is turned off, thereby allowing optical current to integrate on integration node 104.

The voltage on column line 106, and therefore the output signal of imaging pixel 100 when transistor T3 is on, is impacted by a number of noise sources. The noise sources include the offset voltage of T2, pixel-to-pixel variations in the "reset" or "black-level" at integration node 104 due to variations in the threshold of precharge transistor T1, charge injection into integration node 104 caused by a state transition of precharge transistor T1, reset noise (also referred to as kTC noise, where k is Boltzmann's constant, T is temperature, and C is capacitance) on integration node 104, thermal noise from T2, and flicker noise (also referred to as 1/f noise) from T2. Some, yet not all, of these noise sources are relatively constant from one integration cycle to the next, but vary from pixel-to-pixel. Those noise sources which vary from pixel-to-pixel give rise to fixed pattern noise.

Correlated Double Sampling (CDS) is a technique used to eliminate some of the noise sources listed above. In conventional CDS, the output signal of a pixel is sampled twice per integration cycle. One sample captures the reset level of integration node 104 (when precharge transistor T1 is on), while one sample captures the integrated level of integration node 104, i.e., the voltage on integration node 104 at the end of the integration period. The reset level is then subtracted from the integrated level to provide a rough value of the charge accumulated on the integration node.

SUMMARY

Some aspects of the invention relate to methods and apparatus for implementing multiple correlated double sampling (CDS) operations on each imaging pixel of an array of imaging pixels during a single integration cycle of the imaging pixels. The array may contain hundreds of imaging pixels, or more, or any suitable number of imaging pixels.

According to one aspect, an apparatus is provided comprising an array of MOS imaging pixels comprising a first group of MOS imaging pixels. The apparatus further comprises a first column line interconnecting the first group of MOS imaging pixels to form a first column of the array, the first column line being configured to receive a pixel output signal from each of the first group of MOS imaging pixels. The apparatus further comprises a first correlated double sampling (CDS) circuit comprising a charge amplifier having an input capacitor, the input capacitor of the charge amplifier coupled directly to the first column line to receive the pixel output signals from the first group of MOS imaging pixels.

According to another aspect, a method of processing output signals of an array of MOS imaging pixels arranged in n rows and m columns is provided. The method comprises performing m first correlated double sampling (CDS) operations, one CDS operation of the m first CDS operations being performed on an output signal of each one of m MOS imaging pixels, the m first CDS operations producing m first CDS values. The method further comprises multiplexing the m first CDS values to produce a serial data stream of the m first CDS values. The method further comprises performing m second CDS operations, one CDS operation of the m second CDS operations being performed on the output signal of each one of the m MOS imaging pixels, the m second CDS operations producing m second CDS values. The m second CDS operations are part of a same integration cycle as the m first CDS operations. The method further comprises multiplexing the m second CDS values to produce a serial data stream of the m second CDS values.

According to another aspect, a method of processing a pixel output signal of a MOS imaging pixel is provided. The MOS imaging pixel has a pixel output terminal connected to an input capacitor of a charge amplifier, the charge amplifier further comprising a gain stage having a gain stage input terminal and a gain stage output terminal. The gain stage input terminal is coupled to the input capacitor. The charge amplifier has a gain. The method comprises performing a first correlated double sampling (CDS) operation on the pixel output signal. Performing the first CDS operation comprises providing a first value of the pixel output signal to the input capacitor for a first period of time, short circuiting the gain stage input terminal to the gain stage output terminal for at least a portion of the first period of time, establishing a capacitance between the gain stage input terminal and the gain stage output terminal, and providing a second value of the pixel output signal, differing from the first value by a first amount, to the input capacitor so that a signal is provided at the gain stage output terminal equal to the first amount multiplied by the gain of the charge amplifier.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
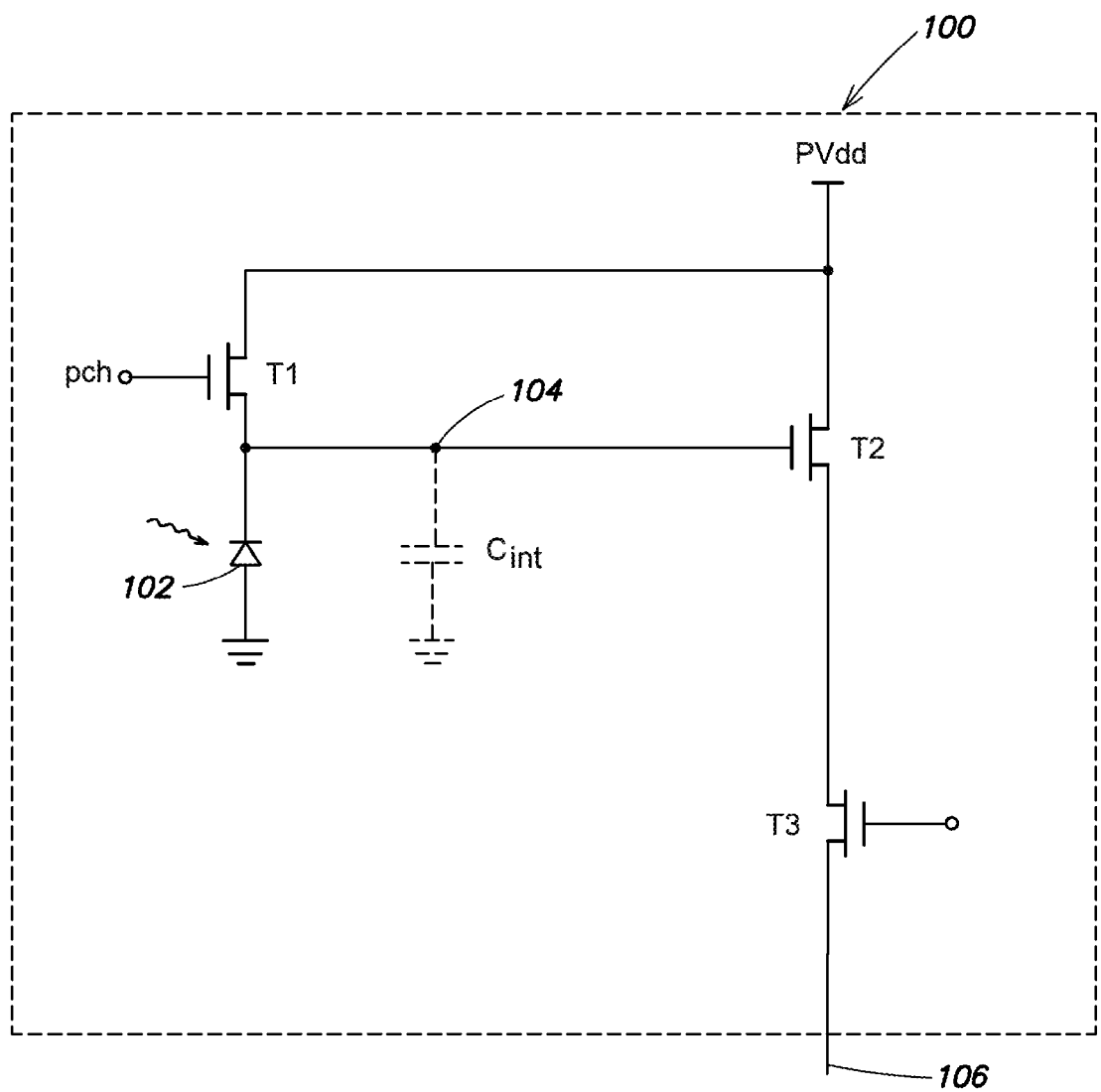
FIG. 1 is a metal oxide semiconductor (MOS) imaging pixel circuit according to the Prior Art.

Applicants have appreciated that conventional CDS, as described above, has some deficiencies. Regardless of which two sample points are used for the CDS operation, the CDS output signal will include at least some of the noise sources listed previously. Referring again to FIG. 1, if the two sample points chosen include a reset value of the pixel (when precharge transistor T1 is on, or immediately after it has been turned off) and a subsequent integrated value, the resulting CDS signal will contain 1/f (flicker) noise because of the relatively long time period between sample points. Alternatively, if the two sample points are the integrated value of the pixel and a subsequent reset value, the resulting CDS signal will contain kTC noise. In addition, if the two sample points are a reset value of the imaging pixel and a subsequent integrated value, the reset value and subsequent integrated value typically are converted to digital form prior to being subtracted as part of the CDS process because of the relatively long time period between them, making it difficult to apply on-chip analog gain to these signals since any dc offset due to noise can cause the amplified signals to saturate, e.g., hit a supply rail voltage.

According to one aspect of the invention, multiple CDS operations are performed on the output signal of an imaging pixel during a single integration cycle of the imaging pixel. For example, two CDS operations may be performed on the output signal of the imaging pixel during a single integration cycle, using four sampled values of the imaging pixel output signal. Each CDS operation may produce a CDS value, and the two CDS values may be processed in combination (e.g., subtraction, addition, etc.) to produce a resulting CDS value substantially free of noise. In some implementations, the first and second CDS operations may be performed in the analog domain, and the two resulting CDS values may then be processed in combination in a digital domain.

The two CDS operations performed as part of a same integration cycle of the imaging pixel may each include sampling a reference signal that has substantially the same value when sampled at different times within an integration cycle. For example, the two sample points of the first CDS operation may include a first occurrence of the reference signal and a value of the imaging pixel output signal close in time to the first occurrence of the reference signal. By utilizing two sample points close in time, the effect of 1/f noise on the resulting CDS value may be substantially eliminated. The two sample points of the second CDS operation may include a second occurrence of the reference signal and a value of the imaging pixel output signal close in time to the second occurrence of the reference signal. Again, by utilizing two sample points close in time, the effect of 1/f noise on the resulting CDS value may be substantially eliminated.

The results of the first CDS operation and the second CDS operation (i.e., the first and second CDS values) may then be processed in combination. For example, according to one implementation, the CDS value of the first CDS operation may be subtracted from the CDS value of the second CDS operation. Because the value of the first occurrence of the reference signal may be substantially equal to the value of the second occurrence of the reference signal, subtracting the first CDS value from the second CDS value may produce a resulting CDS value representing a difference between the two non-reference signal sample points of the two CDS operations (e.g., the integrated value of the imaging pixel output signal and the value of the imaging pixel output signal sampled shortly after the first occurrence of the reference signal, as described above). The value produced by combining the first and second CDS values (e.g., by subtracting the first CDS value from the second CDS value) may be substantially free of kTC noise, for example if the two non-reference signal sample points (e.g., the integrated value of the imaging pixel output signal and the value of the imaging pixel output signal sampled shortly after the first occurrence of the reference signal, as described above) correspond to a same reset event of the imaging pixel and therefore are each individually impacted by an approximately equal amount of kTC noise.

As described in greater detail below, some aspects of the invention relate to the design and operation of circuitry capable of performing multiple CDS operations on a large array of imaging pixels. MOS imagers typically may include hundreds, thousands, or even millions of imaging pixels. For example, a typical MOS imaging array may include 1024 rows of MOS imaging pixels and 1024 columns of MOS imaging pixels (i.e., a 1024×1024 array), providing a total of more than one million MOS imaging pixels in the array. According to some embodiments, circuits and methods for performing multiple CDS operations during a single integration cycle may be compatible with such large arrays.

For example, according to one aspect of the invention, a method of performing multiple CDS operations on the imaging pixels of an array comprises performing a first CDS operation on a first group of imaging pixels of the array (e.g., a first row of the array) at substantially the same time as each other to generate a first group of CDS values. The first group of CDS values may then be multiplexed to produce a serial data stream of the first group of CDS values, which values may then be stored for later processing. A second CDS operation may then be performed on each of the first group of imaging pixels of the array at substantially the same time as each other to generate a second group of CDS values. The second CDS operations may be part of a same integration cycle as that in which the first CDS operations were performed. The second group of CDS values may then be multiplexed to produce a serial data stream of the second group of CDS values, which may then be stored for later processing, such as for being combined with the first group of CDS values.

It should be appreciated that some embodiments described herein are not limited to any particular size of an array of imaging pixels. For example, according to one aspect of the invention, multiple CDS operations are performed on an imaging pixel using a CDS circuit having a charge amplifier with an input capacitor. The charge amplifier with input capacitor may be a single-ended circuit coupled directly to an output terminal of the imaging pixel, or directly to a column line interconnecting output terminals of multiple imaging pixels.

Various aspects of the invention will now be described. These aspects may be used singly, all together, or in any combination of two or more.

As mentioned, according to some aspects of the invention, multiple CDS operations are performed on the output signal of an imaging pixel during a single integration cycle of the imaging pixel. According to one embodiment, two CDS operations are performed during the integration cycle, using four sampled values of the imaging pixel output signal. The two CDS values produced by the two CDS operations (i.e., one CDS value may be produced by each CDS operation) may be processed in combination (e.g., by subtracting one from the other) to produce a resulting CDS value.

According to one embodiment, the first CDS operation of the two CDS operations may involve sampling the imaging pixel output signal twice near the beginning of the integration cycle of the imaging pixel. The two sampled values may be close in time to each other. The second CDS operation may involve sampling the imaging pixel output signal twice near the end of the integration cycle of the imaging pixel, after photocurrent has been integrated on an integration node of the imaging pixel. The two sampled values for the second CDS operation may be close in time to each other.

According to one embodiment, each of the two CDS operations may involve sampling a reference signal (e.g., a reference voltage) of the imaging pixel output signal as one of the two sample values for that CDS operation. The imaging pixel output signal may be set to the reference voltage at multiple times, or occurrences, during the integration cycle of the imaging pixel, for example by "resetting" the imaging pixel, as described below. Thus, according to one embodiment, the first CDS operation performed on the imaging pixel during the integration cycle may involve sampling a first occurrence of the reference voltage as one of the two sample values for that CDS operation, as well as sampling a second value of the imaging pixel output signal close in time to the first occurrence of the reference voltage as the second sample value of that CDS operation. The second CDS operation may involve sampling a second occurrence of the reference voltage as the first sample value of that CDS operation, as well as sampling the imaging pixel output signal close in time to the second occurrence of the reference voltage as the second sample value of that CDS operation. The sampled values of the first and second occurrences of the reference voltage may be substantially the same, i.e., both approximately equal to the reference voltage.

According to some embodiments, a "hard reset" state of the imaging pixel output signal may serve as the reference signal for the imaging pixel output. A "hard reset" is a state in which a node of the imaging pixel (e.g., an integration node) is connected to a reference signal (e.g., a voltage) through a switch in its ON state when the voltage of the node reaches its limit. The term "switch" as used herein refers to any device or component that can be controlled to be in an OFF state (i.e., high impedance state) or an ON state (i.e., low impedance state). As one example, if the "switch" is a MOS transistor, then a hard reset state is when the MOS transistor is in inversion (i.e., ON) when the voltage of the node of the imaging pixel assumes its limit, i.e., the reference voltage to which the node is connected through the MOS transistor. This scenario occurs if the gate-to-source voltage of the MOS transistor is greater than the threshold voltage of the MOS transistor when the voltage of the node assumes the reference voltage. It should be appreciated, however, that aspects of the invention described herein are not limited to implementing "hard resets" with a MOS transistor as the switch, as other types of transistors or components can be used as a switch to provide a hard reset, including those having an ON state which is not referred to as "inversion."

Conventional MOS imaging pixels are not capable of providing a hard reset, but rather provide a "soft reset," as now described with reference to FIG. 1. The conventional imaging pixel 100 of FIG. 1 is reset (i.e., put in a "soft reset" state) when precharge transistor T1 is turned on. Precharge transistor T1 is controlled by a signal pch at its gate. In conventional MOS imaging pixels, the NMOS precharge transistor T1 has its drain connected to the supply voltage PVdd and its source connected to the integration node 104. The maximum value that the signal pch can take is the same as the supply voltage PVdd at the drain terminal of precharge transistor T1. As a result, when precharge transistor T1 is on, the voltage on integration node 104 approaches a precharge voltage which is equal to the supply voltage PVdd minus the threshold voltage of precharge transistor T1. As the voltage on integration node 104 approaches this precharge voltage (PVdd minus the threshold voltage of T1), the gate-to-source voltage of precharge transistor T1 approaches the threshold voltage of precharge transistor T1, such that the impedance of T1 rapidly increases, and precharge transistor T1 begins to turn off and enters a subthreshold state. Thus, the precharge transistor is not in inversion (i.e., is not ON) when the voltage of the integration node reaches its limit (PVdd minus the threshold voltage of T1), and the imaging pixel does not achieve a hard reset state.

In its subthreshold state, precharge transistor T1 will generate thermal noise on the integration node 104. As a result of the high impedance of precharge transistor T1, and the presence of the integration capacitance $C_{int}$, the thermal noise of precharge transistor T1 in its subthreshold state will appear as low frequency noise on the integration node 104. The voltage on the integration node during this "soft reset" state will then be equal to the precharge voltage (PVdd minus the threshold voltage of T1) plus a low frequency noise component due to the thermal noise of precharge transistor T1 in its subthreshold state, and therefore will not equal the precharge voltage itself. In the conventional imaging pixel, then, the voltage on the integration node 104 is not capable of being accurately and consistently reset to a known reference voltage. Rather, the conventional imaging pixel 100 can only be put into a "soft reset" state.

According to some embodiments, an imaging pixel is provided that is capable of providing a hard reset of an integration node of the imaging pixel. The imaging pixel may have a precharge transistor coupling the integration node to a reference voltage in such a manner that the precharge transistor will remain ON, and therefore in a low impedance state, as the voltage of the integration node assumes the voltage of the reference voltage.

According to one embodiment, an imaging pixel includes a precharge transistor coupling an integration node to a reference voltage, and having a polarity (i.e., NMOS or PMOS) such that the polarity of the gate-to-source voltage needed to turn on the precharge transistor is opposite to the polarity of the reference voltage connected to the precharge transistor. According to an alternative embodiment, an imaging pixel includes a precharge transistor coupling an integration node to a reference voltage, for which a maximum voltage of the input signal to the precharge transistor (i.e., signal pch in FIG. 2C, described below) is greater than the reference voltage connected to the precharge transistor (i.e., $PV_{dd}$ in FIG. 2C) by an amount at least equal to the threshold voltage of the precharge transistor. Under either alternative embodiment, the precharge transistor can remain ON (and therefore in a low impedance state) even as the voltage of the integration node of the imaging pixel approaches the reference voltage. Examples of both scenarios are now given.

Figure 2A:
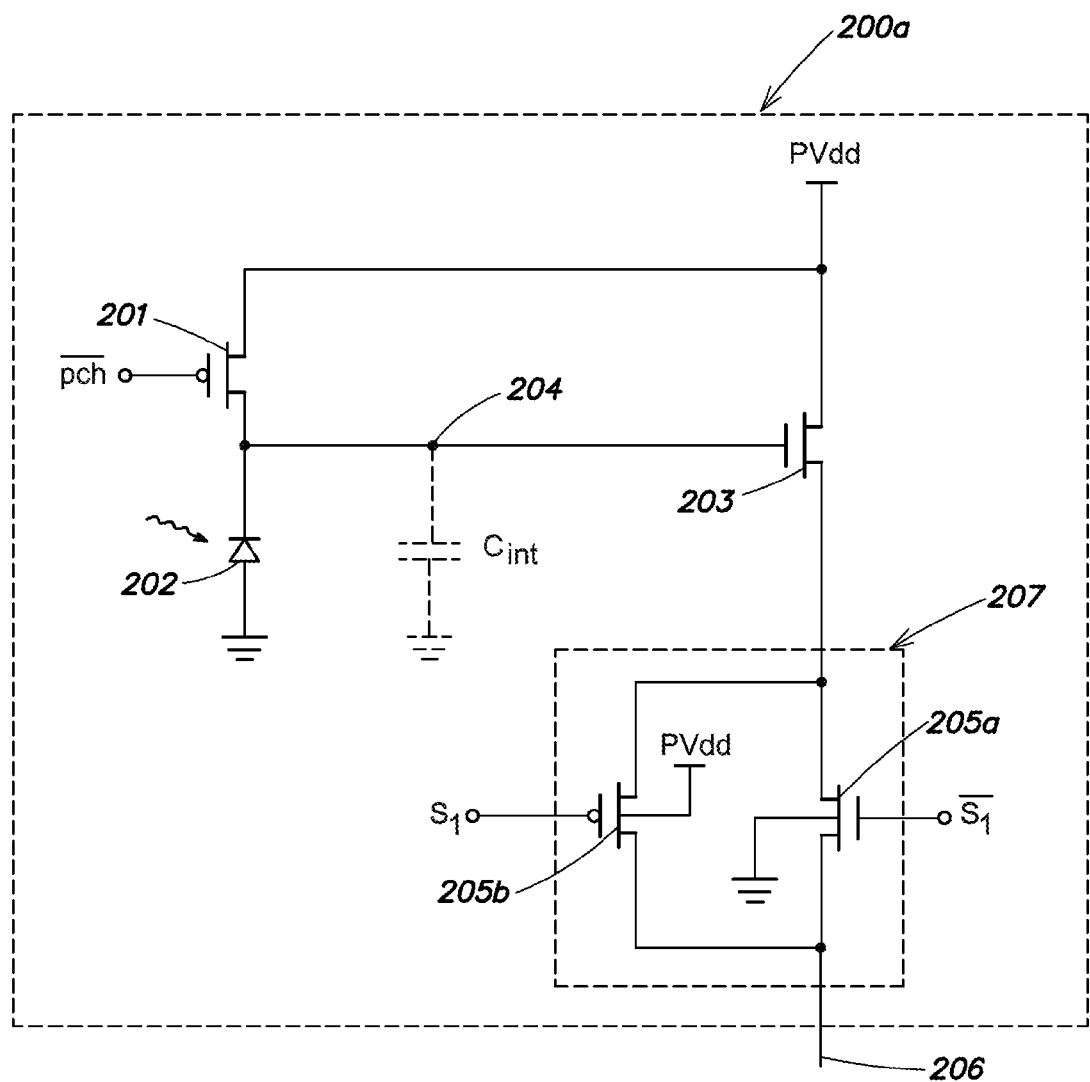
FIG. 2A is a MOS imaging pixel circuit providing a hard reset of the integration node, according to one embodiment.

FIG. 2A shows a 3T MOS imaging pixel providing a hard reset of the pixel integration node, according to one embodiment. The imaging pixel 200a includes precharge circuitry comprising precharge transistor 201. The precharge transistor 201 is a PMOS transistor, so that it is turned ON by applying a low value of the input signal $\overline{pch}$ to its gate terminal. Since precharge transistor 201 is a PMOS transistor, the source of precharge transistor 201 is connected to the reference voltage PVdd and the drain of precharge transistor 201 is connected to the integration node 204. As a result, precharge transistor 201 will not turn off as the voltage on integration node 204 approaches PVdd (which may be a positive supply rail or any other positive constant voltage), and therefore will not transition from a low impedance state to a high impedance state as the voltage on integration node 204 approaches PVdd. Any thermal noise generated by precharge transistor 201 in its low impedance state on the integration node 204 will appear as a wide-band noise component on integration node 204, most of which is filtered out by the source follower transistor 203. Any remaining low-frequency noise components generated by precharge transistor 201 on integration node 204 in its low impedance state are negligible. The voltage on integration node 204 therefore can be made substantially equal to PVdd when precharge transistor 201 is turned on, and can be made so repeatedly with high accuracy.

The photodiode 202 of imaging pixel 200a may generate a photocurrent integrated on integration node 204. The value of integration node 204 may be read out of the imaging pixel 200a, i.e., sampled, to column line 206 at any time during the operation of imaging pixel 200a by turning on the complementary switch 207, which comprises NMOS transistor 205a controlled by signal $\overline{S1}$ and PMOS transistor 205b controlled by signal S1, the logical opposite of $\overline{S1}$. When complementary switch 207 is on, the transistor 203 may operate as a source follower, for example, if connected to a load on column line 206. Thus, the voltage at the source of transistor 203 may substantially track the voltage of integration node 204.

Figure 2B:
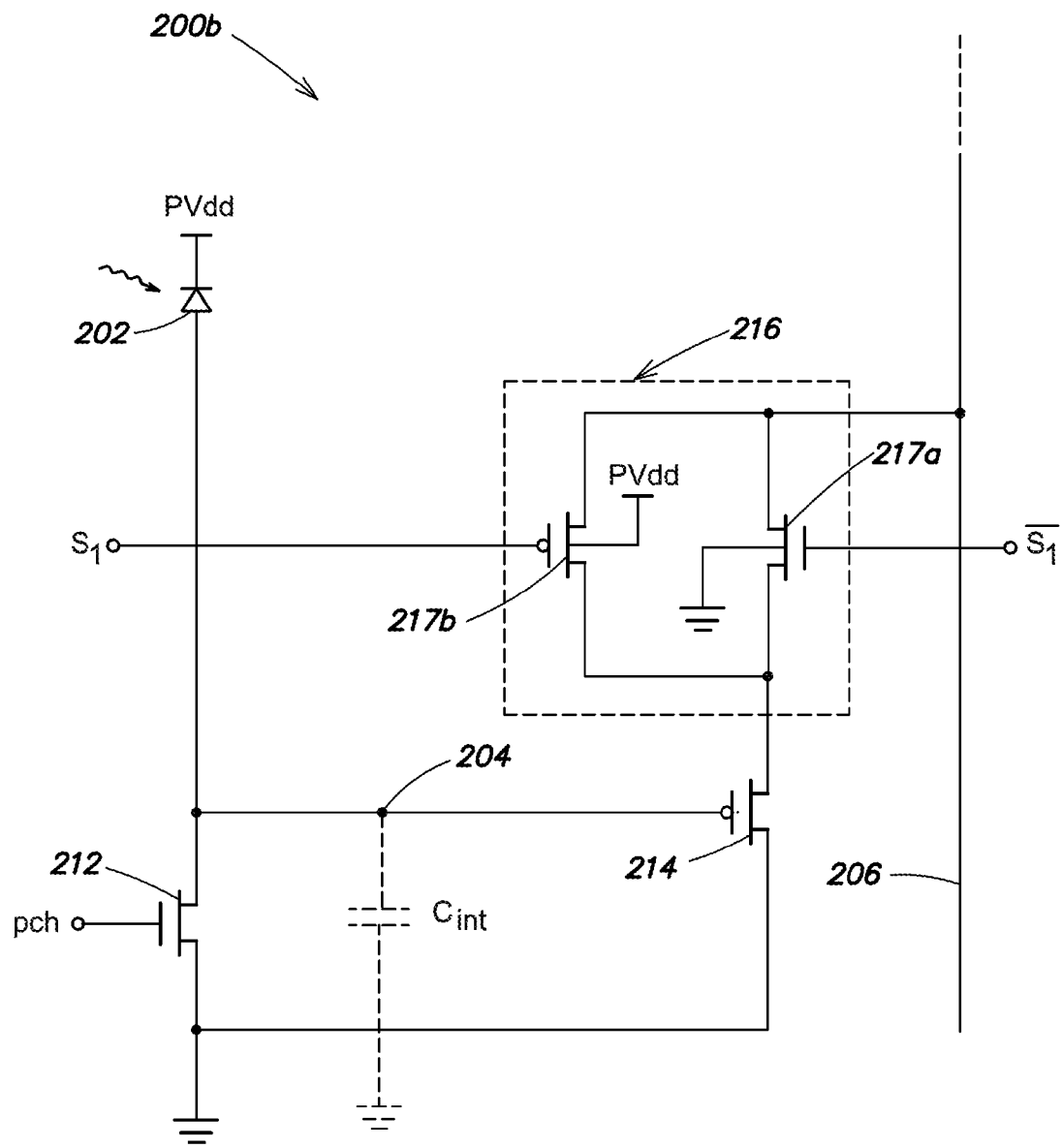
FIG. 2B is an alternative to the circuit of FIG. 2A, providing a hard reset of the integration node of the MOS imaging pixel, according to another embodiment.

FIG. 2B illustrates an alternative to the imaging pixel 200a of FIG. 2A, which also provides a hard reset of the integration node of the imaging pixel. The imaging pixel 200b is the "opposite" of imaging pixel 200a. Specifically, the precharge transistor 212 is an NMOS transistor (as opposed to the PMOS precharge transistor 201 in pixel 200a) which couples the integration node to ground. The source follower 214 is a PMOS transistor as opposed to the NMOS source follower 203 of pixel 200a. The photodiode 202 in pixel 200b is coupled directly to a positive voltage PVdd, as opposed to being connected directly to ground, as in pixel 200a.

A hard reset of integration node 204 in pixel 200b can be achieved by turning on precharge transistor 212 by applying a high value of the input signal pch to its gate. The value of the hard reset voltage of integration node 204 will be substantially equal to ground, and the precharge transistor 212 will remain ON even as the voltage of the integration node approaches, and reaches, ground. Therefore, the voltage of the integration node can accurately, and repeatedly, be set to ground.

The voltage of the integration node 204 of imaging pixel 200b can be read out, or sampled, to column line 206 at any time during the operation of the imaging pixel 200b by turning on complementary switch 216. The complementary switch 216 comprises an NMOS transistor 217a controlled by the input signal $\overline{S1}$ and a PMOS transistor 217b controlled by the input signal S1. Transistor 217a has its body terminal connected to ground, while transistor 317b has its body terminal connected to the positive voltage source PVdd.

Conventionally, only transistors of one polarity (e.g., NMOS or PMOS) are used in an imaging pixel to facilitate making the circuitry of the imaging pixel small, to consume as little space as possible. By contrast, imaging pixels 200a and 200b each include both PMOS and NMOS transistors. A doping well may be formed to isolate one of those types of transistors (i.e., either the PMOS transistors or the NMOS transistors) from a substrate of the pixel (e.g., a silicon substrate, or any other suitable substrate).

Figure 2C:
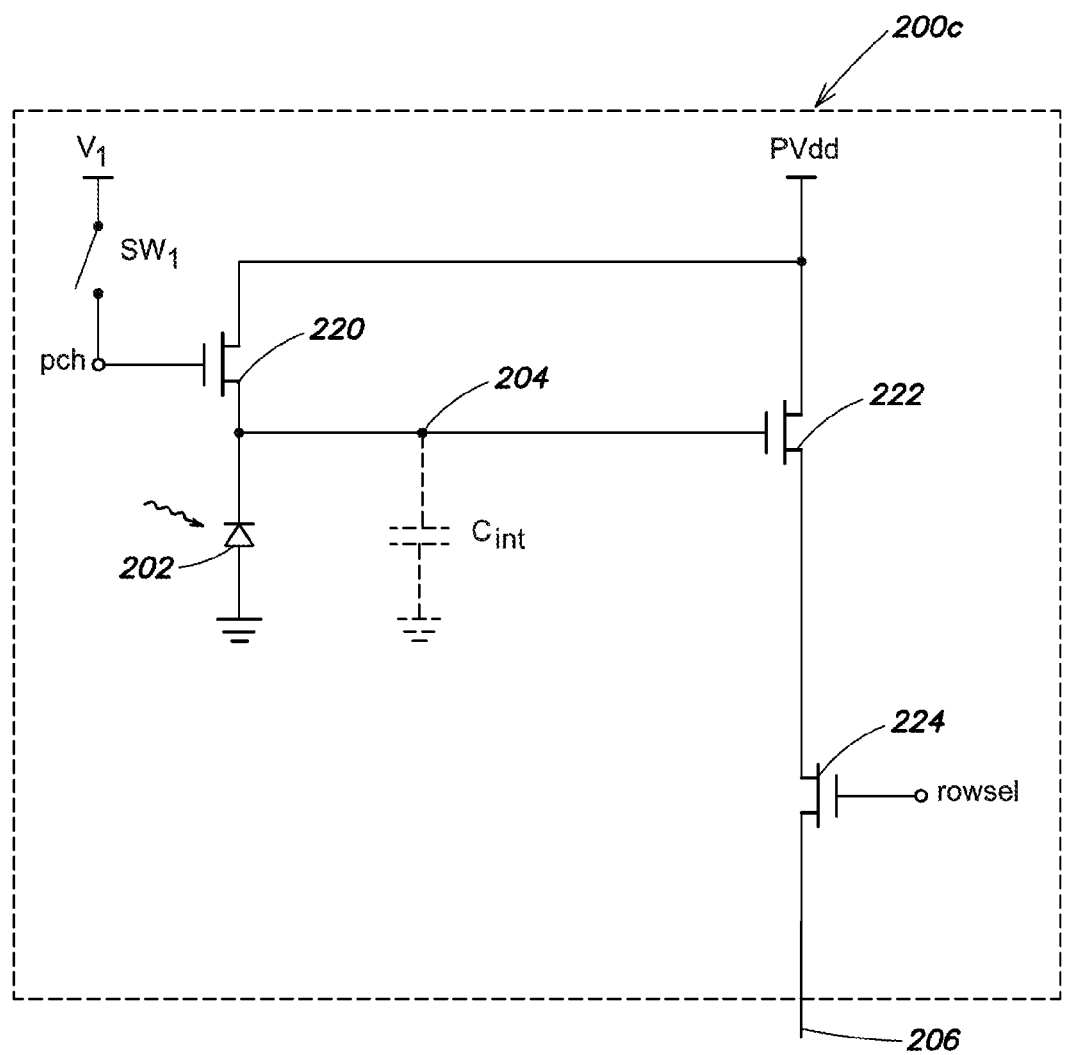
FIG. 2C is a second alternative to the MOS imaging pixel circuit of FIG. 2A, providing a hard reset of the integration node of the imaging pixel, according to another embodiment.

FIG. 2C is a third alternative of an imaging pixel capable of providing a hard reset of the integration node. The imaging pixel 200c differs from the conventional imaging pixel 100 of FIG. 1 in that the maximum value of the input signal pch to precharge transistor 220 has a value $V_1$, which may be greater than the voltage PVdd by an amount at least equal to the value of the threshold voltage of precharge transistor 220. Therefore, when signal $V_1$ is provided to precharge transistor 220, for example by closing a switch $SW_1$, the precharge transistor 220 may remain in an ON state, and therefore in a low impedance state (i.e., in inversion in the non-limiting example of FIG. 2C), as the voltage on the integration node 204 reaches its limit when approaching PVdd. The voltage of the integration node 204 can therefore be accurately, and repeatedly, set to approximately PVdd by turning on precharge transistor 220.

It should be appreciated that the aspect of the invention relating to an imaging pixel having a precharge transistor receiving an input signal having a maximum value greater than a reference voltage connected to the precharge transistor by an amount at least equal to the threshold voltage of the precharge transistor is not limited to any particular manner of making the input signal greater than the reference voltage. For example, $V_1$ and PVdd, shown in FIG. 2C, may both be supply rails, with $V_1$ having a greater value than PVdd. Alternatively, $V_1$ may be a supply rail and PVdd may be down-converted from $V_1$.

The voltage on integration node 204 of imaging pixel 200c may be read out, or sampled, to column line 206 at any point in time during the operation of imaging pixel 200c by turning on transistor 224 with a suitable value of the input signal rowsel. When on, transistor 224 connects the source terminal of source follower transistor 222 to column line 206, and to a load on the column line 206 (not shown).

The imaging pixels 200a-200c may each operate similarly, one example of which is now described. In one aspect, the operation of each type of imaging pixel is cyclical. An integration cycle of the imaging pixel may start by placing the imaging pixel in hard reset (HR), i.e., performing a hard reset of the integration node of the imaging pixel, which may serve as a reset (or "black") level for the imaging pixel. The hard reset may subsequently be released. Then, integration of photocurrent generated by the pixel photodetector may begin on the integration node. The integration period, i.e., the time during which photocurrent is integrated on the integration node, may have a duration of 30 milliseconds, 40 milliseconds, or any other suitable duration. At the end of the integration period, the imaging pixel may again be put into hard reset by turning on the precharge transistor of the pixel. The process may then be repeated.

A specific example of the operation of pixel 200a is now described with reference to FIG. 3. It should be appreciated that imaging pixels 200b-200c may operate similarly. Also, it should be appreciated that the operation illustrated in FIG. 3, and now described, is merely an example, and that other manners of operation are possible. For example, the order of events illustrated in FIG. 3 is non-limiting, as is the number of events shown.

Figure 3:
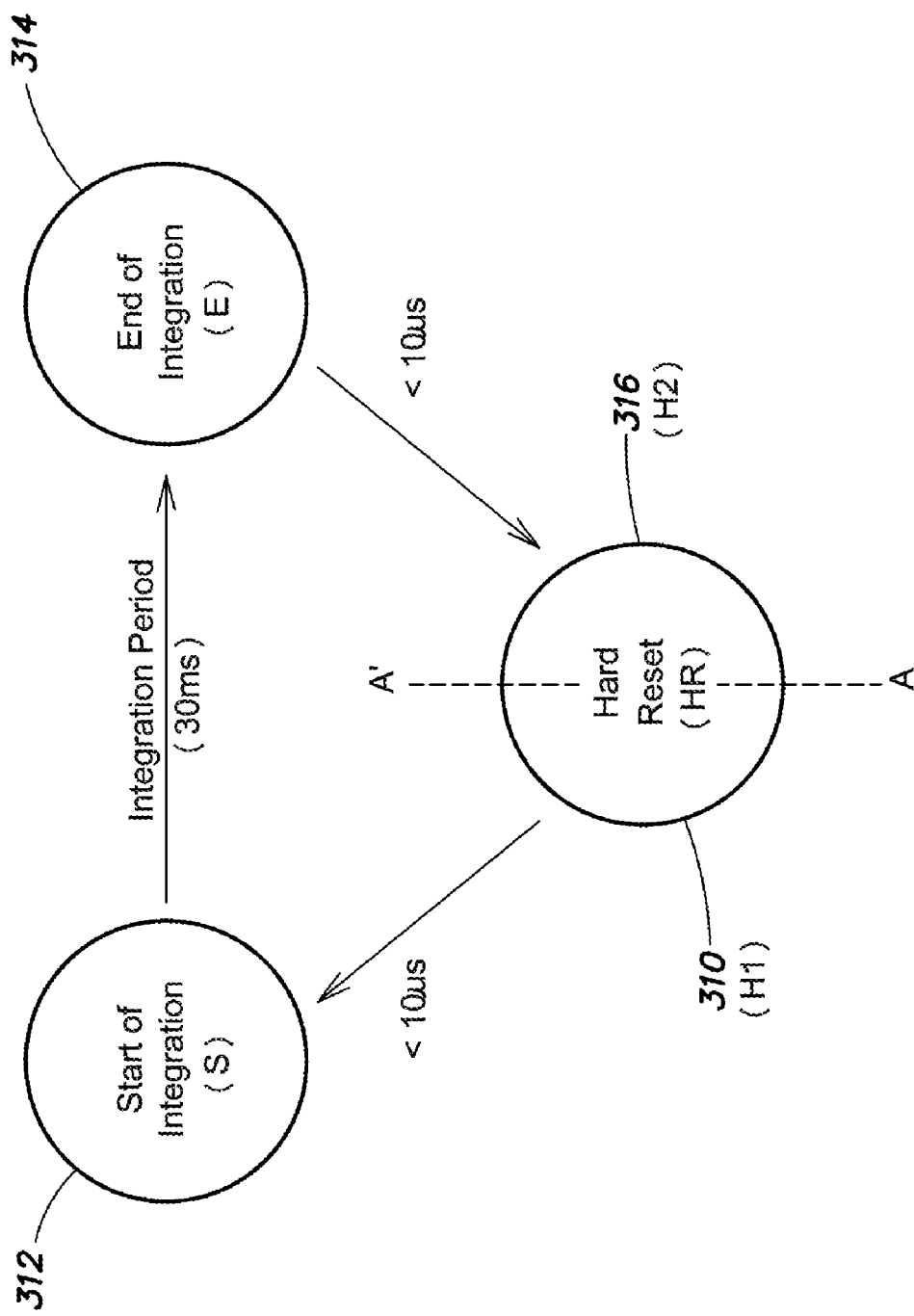
FIG. 3 illustrates the order of operation of a MOS imaging pixel, according to one embodiment.

As shown in FIG. 3, an imaging pixel (e.g., imaging pixel 200a) may assume multiple different states during its operation. The states may include one or more hard reset states, and one or more periods of integration of photocurrent. For example, at the beginning of an integration cycle, the imaging pixel 200a may be put into a hard reset (HR) state 310 (H1). The precharge transistor 201 may be turned on by setting the input signal $\overline{pch}$ low, thus setting the voltage level on the integration node 204 to a value Vh1 substantially equal to PVdd.

The imaging pixel 200a may subsequently assume a start-of-integration (S) state 312. The start-of-integration state may be achieved, for example, by setting the input signal $\overline{pch}$ high, turning off the precharge transistor 201, such that photocurrent can begin to integrate on the integration node. Thus, the start-of-integration state S corresponds to the beginning of an integration period of the imaging pixel. The voltage Vs of the integration node 204 in start-of-integration 312 may include noise sources, such as reset noise (kTC) and reset charge injection, which may cause the voltage Vs of the integration node during S to differ from Vhf (the voltage of the integration node during H1).

The integration period (the time during which photocurrent from photodetector 202 is integrated on integration node 204) may have a duration of 30 milliseconds, or any other suitable duration. At the end of the integration period, the pixel is said to be in an end-of-integration state (E) 314. The end-of-integration state (and therefore the end of the integration period) occurs when the integrated voltage on the integration node is read out by turning on complementary switch 207 in imaging pixel 200a. The voltage, or integrated level, stored on integration node 204 at the end 314 of the integration period may be represented by Ve, which may differ from Vs by an amount equal to the value of the integrated photocurrent.

The imaging pixel 200a may then be put into a hard reset state again at 316 (H2), by turning on precharge transistor 201, at which time the voltage on integration node 204 may be Vh2, substantially equal to PVdd. The process may then repeat for a second integration cycle, i.e., cycling through the states 310-312-314-316 again.

The hard reset 316 at the end of an integration cycle may be the same as the hard reset 310 of a subsequent integration cycle. In other words, the imaging pixel 200a may remain in a hard reset state from the end of one integration cycle through the beginning of the next integration cycle. Alternatively, the hard reset events 310 and 316 may be distinct, as illustrated by the dashed line A-A'. For example, hard reset 316 may be performed by turning on precharge transistor 201 of pixel 200a at the end of an integration cycle. The precharge transistor may then be released, e.g., while processing is performed on other pixels in an imaging array comprising imaging pixel 200a, or for any other reason. Then, when imaging pixel 200a is again to be operated on, the precharge transistor 201 may be turned on to put the imaging pixel into hard reset 310 for the next integration cycle.

At any time during the operation of imaging pixel 200a, the voltage on integration node 204 may be read out (sampled) to column line 206 by closing the complementary switch 207. By turning on the complementary switch 207 (i.e., turning on either transistor 205a or transistor 205b, or both), the source of transistor 203 may be connected to a load on column line 206, such that transistor 203 may operate as a source follower. The column line 206 may connect multiple pixels, like pixel 200a, to form a column, for example in an imaging array. As mentioned, the array can be any size, as various aspects of the invention are not limited to use with arrays of any particular size.

As mentioned above, according to some aspects of the invention, two CDS operations may be performed on an imaging pixel, such as imaging pixel 200a, during a single integration cycle of the imaging pixel. The two CDS operations may be performed using four sampled values of the imaging pixel output signal from the same integration cycle. According to one implementation, two of the four sampled values represent samples of a reference signal, such as a hard reset of the imaging pixel. Each CDS operation may use one of the sampled values of the reference signal and an additional sample value to generate a CDS value. The two CDS values of the two CDS operations may be processed in combination (e.g., summed, subtracted, or any other suitable operation) to produce a resulting signal representative of the difference between the two non-reference signal sample values. An example can be understood by referring again to FIG. 3.

According to one embodiment, an imaging pixel operates according to the integration cycle shown in FIG. 3, i.e., with a hard reset 310, an integration period from start-of-integration (S) 312 to end-of-integration (E) 314, and finally a hard reset 316. A first CDS operation may be performed by sampling a value of the imaging pixel output signal Vh1 when in the hard reset state 310 and then sampling a value Vs in the subsequent start-of-integration state 312. The CDS operation may involve subtracting the sampled hard reset value Vh1 from the sampled start-of-integration value Vs to produce a CDS value.

The second CDS operation may be performed at the end of the integration cycle of the imaging pixel, by sampling the end-of-integration value Ve at 314 and the subsequent hard reset value Vh2 at 316, i.e., a second occurrence of the hard reset value during the integration cycle. The second CDS operation may involve subtracting the sampled value Vh2 of the second occurrence of the hard reset at 316 (H2) from the sampled value Ve of the end-of-integration state to generate a second CDS value. The first CDS value can then be subtracted from the second CDS value to generate a value representing the difference between the sampled end-of-integration value Ve and the sampled start-of-integration value Vs.

The samples of the imaging pixel output signal may be taken at any suitable time intervals, and may be chosen, for example, to reduce noise in the resulting CDS values. For example, the sampled value Vs taken at the start-of-integration 312 may be taken close in time to the sampled value Vh1 taken at hard reset 310, such as within 10 microseconds, or any other suitable time interval. One result of choosing samples close in time is that the resulting CDS value, obtained by subtracting one of the sample points from the other sample point, can be substantially free of 1/f noise.

Similarly, the sampled value Ve taken at end-of-integration 314 and the subsequent sampled value Vh2 taken at hard reset 316 can be close in time. For example, the sampled value Ve and the subsequent sampled value Vh2 may be separated by less than 10 microseconds, or by any other suitable time interval. Again, by choosing sample points close in time, the resulting CDS value from processing the two sample points can be substantially free of 1/f noise.

The two sample pairs for the two CDS operations may be separated in time by the integration period of the imaging pixel. For example, the time between the sampled value Vs at start-of-integration 312 and the sampled value Ve at end-of-integration 314 may be equal to the integration period of the imaging pixel, and may be 30 milliseconds, 40 milliseconds, or any other suitable time for an integration period.

Figure 4:
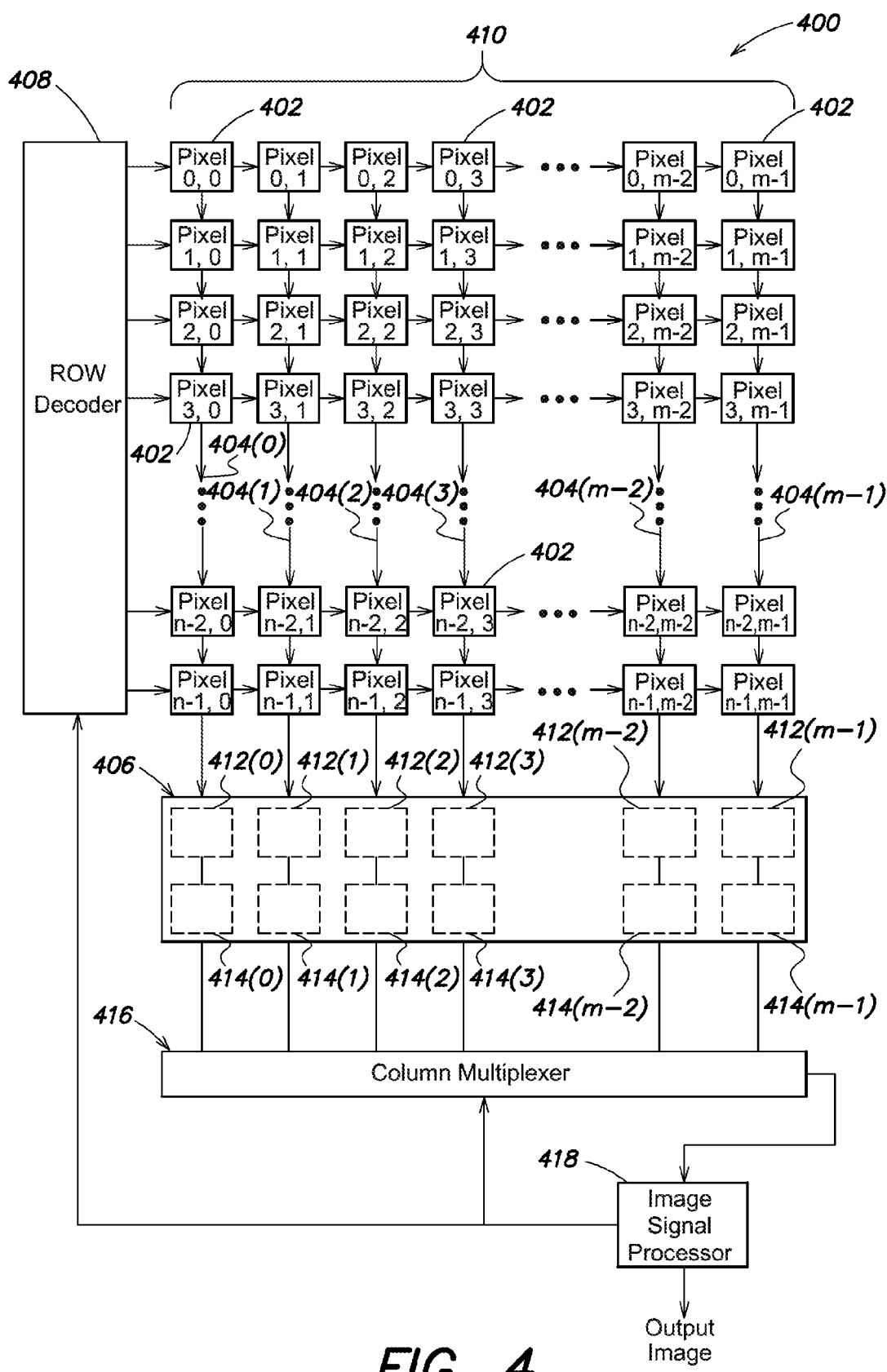
FIG. 4 is an imager incorporating imaging pixels such as those shown in FIGS. 2A-2C, according to one embodiment.

As mentioned, some aspects of the invention involve applying multiple CDS operations per integration cycle to an array of imaging pixels. In some embodiments, the array may be large, having one hundred pixels, one thousand pixels, more than a million pixels, or any other suitable number of pixels. FIG. 4 illustrates an exemplary configuration for an array of imaging pixels to which the method of performing multiple CDS operations per integration cycle may be applied.

The imager 400 comprises an imaging array 410, which includes a plurality of imaging pixels 402. In the non-limiting example of FIG. 4, the plurality of imaging pixels 402 are arranged in n rows, and m columns. The imager 400 also includes m column lines 404 (i.e., column lines 404(0), 404(1), 404(2), 404(3), . . . , 404(m−2), 404(m−1)). Each of the m column lines interconnects n pixels to form one of the m columns. For example, each column line may interconnect the output terminals of the n imaging pixels of that column. Thus, the output signals of the imaging pixels of the column can be provided to the column line, and then to column termination and processing circuitry 406, described further below.

The imager 400 further comprises a row decoder 408, which may select a particular row of pixels, such that the output signals of those pixels are read out onto their respective column lines. For example, a row select signal can be applied to row 1 (i.e., pixel 1, 0; pixel 1, 1; pixel 1, 2; pixel 1, 3 . . . pixel 1, m−2; and pixel 1, m−1). The row select signal may turn on row select circuitry in each imaging pixel, such as the complementary switch 207 in pixel 200a. In response to the row select signal, each of the pixels in the row may output an output signal to their respective column line 404.

The row decoder 408 may also perform other functions. For example, the row decoder 408 may control the precharging of imaging pixels within a particular row. For example, the row decoder 408 may apply a precharge signal to the imaging pixels of a given row, e.g., row 1 (i.e., imaging pixel 1, 0; imaging pixel 1, 1; imaging pixel 1, 2; imaging pixel 1, 3; . . . ; imaging pixel 1, m−2; and imaging pixel 1, m−1). In response to the precharge signal from row decoder 408, precharge circuitry (e.g., precharge transistor 201 in imaging pixel 200a) may be turned on in each imaging pixel to precharge that each imaging pixel.

The output signals of the imaging pixels provided to each column line may be provided to column termination and processing circuitry 406, which may take any suitable form. According to one embodiment, the column termination and processing circuitry includes, for each column, a CDS circuit 412 (i.e., CDS circuits 412(0), 412(1), 412(2), 412(3), . . . , 412(m−2), 412(m−1)) and a sample and hold circuit 414 (i.e., sample and hold circuits 414(0), 414(1), 414(2), 414(3), . . . , 414(m−2), 414(m−1)). While shown in FIG. 4 as distinct from the CDS circuits 412, it should be appreciated that the sample and hold circuits 414 can alternatively be part of the CDS circuits 412.

The outputs of the sample and hold circuits 414 may be provided to a column multiplexer 416, which may multiplex the output signals to produce a serial data stream, and provide the serial data stream to an image signal processor 418. The image signal processor 418 may process the signals in any suitable manner to produce an output image. In addition, the image signal processor 418 may send control signals to row decoder 408 and column multiplexer circuitry 416 to control sampling of imaging pixels within the array 410.

The column termination and processing circuitry 406 may further include additional elements not shown in the non-limiting example of FIG. 4. For example, each column line may include a capacitor for filtering high frequency noise from the imaging pixel output signals on the column line. In addition, each column line may include a load, such as a current source, within the column termination and processing circuitry 406. The load may facilitate operation of a transistor within each imaging pixel operating as a source follower. For example, referring again to pixel 200a of FIG. 2A, the transistor 203 may operate as a source follower when complementary switch 207 is on, if a suitable load is connected to column line 206.

According to one mode of operation of the imager 400, multiple CDS operations may be performed on a selected imaging pixel during a single integration cycle of the imaging pixel. For example, multiple CDS operations may be performed during a single integration cycle on each imaging pixel of row 1 (i.e., pixel 1, 0; pixel 1, 1; pixel 1, 2; . . . ; pixel 1, m−1). At the beginning of an integration cycle, row decoder 408 may send a row select signal to each imaging pixel of row 1 to sample the output signal of each imaging pixel in row 1. For example, the row select signal may turn on a transistor or switch, such as complementary switch 207 in FIG. 2A, in each imaging pixel in row 1, to output the output signals of each imaging pixel in row 1 onto the respective column line 404. Each of the imaging pixels in row 1 may be put into hard reset, such that the hard reset value of each imaging pixel may be sampled onto a respective column line. Subsequently, while the row select signal is still asserted, each imaging pixel of row 1 may be put into a start-of-integration state, for example, by turning off a precharge transistor in each imaging pixel. Thus, a start-of-integration value of each of the imaging pixels in row 1 may be output to a respective column line. The row select signal may then be removed such that the output signals of the imaging pixels in row 1 are not provided to the respective column lines, and integration of photocurrent on an integration node of each imaging pixel in row 1 may then begin.

The sampled hard reset and start-of-integration values of each imaging pixel in row 1 may be provided to respective CDS circuits 412. The CDS circuits may perform a CDS operation on the sampled hard reset and start-of-integration values, such that each CDS circuit generates a first CDS value. The CDS value of each CDS circuit 412 may then be provided to respective sample and hold circuits 414, which may store the CDS values. Meanwhile, as mentioned, each imaging pixel of row 1 may be integrating photocurrent on an integration node of the imaging pixel in response to the imaging array 410 receiving incident radiation. The column multiplexer circuitry 416 may multiplex out the CDS values from sample and hold circuits 414 to create a serial data stream of the CDS values. The serial data stream may be sent to image signal processor 418.

At the end of an integration period of each imaging pixel in row 1, row decoder circuitry 408 may send a row select signal to each imaging pixel of row 1 to sample the end-of-integration value of each imaging pixel output signal, outputting the sampled value onto a respective column line 404. Subsequently, while the row select signal is still asserted, each imaging pixel of row 1 may be put into a hard reset state, for example, by turning on a precharge transistor of each imaging pixel in row 1 to connect an integration node of each imaging pixel in row 1 to a reference voltage through a low impedance. Thus, a second hard reset value within the integration cycle of each of the imaging pixels may be output onto a respective column line.

The CDS circuits 412 at the bottom of each column line may then perform a second CDS operation using the sampled end-of-integration value and the newly sampled hard reset value. Each CDS circuit 412 may therefore generate a second CDS value as part of the same integration cycle as that in which the first CDS value was generated (i.e., the CDS value taken by operating on the initially sampled hard reset and the subsequently sampled start-of-integration value). The second CDS values may be provided to respective sample and hold circuits 414. The column multiplexer 416 may then multiplex out the CDS values stored in the sample and hold circuits to generate a serial data stream of the CDS values which may be sent to image signal processor 418.

The image signal processor may have storage capability, such as a computer memory, for storing the CDS values provided thereto. According to one embodiment, the image signal processor receives two CDS values for each imaging pixel in a row of the imaging array during a single integration cycle of those pixels. The first CDS value represents a CDS operation using a sampled value of an initial hard reset (e.g., a sample value Vh1 taken at hard reset 310 in FIG. 3) and a subsequent sampled start-of-integration value of the imaging pixel, while the second CDS value represents a CDS operation using a sampled end-of-integration value and a subsequent sampled hard reset value of the imaging pixel (e.g., a value Vh2 taken at hare reset 316 in FIG. 3). The two CDS values may be processed in combination. For example, the first CDS value for each imaging pixel may be subtracted from the second CDS value for each imaging pixel, represented as:

$$(Ve-Vh2)-(Vs-Vh1)=(Ve-Vs)+(Vh1-Vh2) \quad \text{(Eq. 1)}$$

where Ve is the sampled end-of-integration value, Vh1 is the hard reset value sampled at the beginning of the integration cycle, Vh2 is the hard reset value sampled at the end of the integration cycle, and Vs is the sampled start-of-integration value. Because the value of Vh1 is substantially equal to the value of Vh2, the term (Vh1−Vh2) is approximately equal to zero, such that subtracting the first CDS value from the second CDS value (as shown in Eq. 1) provides a result substantially equal to the sampled end-of-integration value Ve of the imaging pixel minus the sampled start-of-integration value Vs of the imaging pixel. As mentioned, the amount of kTC noise in the sampled start-of-integration value Vs may be approximately equal to the amount of kTC noise in the sampled end-of-integration value Ve because both values are sampled during a same integration cycle. Therefore, the kTC noise present in each of the values Ve and Vs may be substantially eliminated when Vs is subtracted from Ve. Accordingly, the value of (Ve−Vs) corresponds to the amount of photocurrent integrated in an imaging pixel during the integration period.

For purposes of illustration, a non-limiting example of the timing of the operations described above is now provided for the imager 400. It should be appreciated that the timing may differ, however, depending on factors such as the number of pixels in the imaging array and the number of frames (i.e., scans of all pixels in the imaging array) taken per second by the imager, and that no particular timing of operations is required by various aspects of the invention.

For purposes of this non-limiting example, the imaging array 410 is a 480×640 array (i.e., having 480 rows and 640 columns of imaging pixels) and is operated at 30 frames per second (i.e., each imaging pixel in the imaging array 410 undergoes 30 integration cycles per second), during each of which two CDS operations are performed on the output signal of each imaging pixel. Approximately 64 microseconds may be allocated to sampling output signals of the imaging pixels of a single row in the imaging array 410, processing those signals, and reading out the processed signals from each of the column lines for that row of imaging pixels. Two CDS operations may be performed within this 64 microsecond period on the imaging pixels of that row. For example, each CDS circuit 412 may be allocated approximately 30 microseconds to perform a CDS operation, for example by taking 13 microseconds to sample a first value of an imaging pixel output signal and have that value settle, and then taking another 13 microseconds to sample a second value of the imaging pixel output signal and have that value settle. Then, approximately 4 microseconds may be used for the CDS circuit 412 of each column to provide its output signal (i.e., the CDS values) to a respective sample and hold circuit 414. The CDS circuits may therefore operate at low bandwidth, with low noise and low power consumption, while meeting these timing conditions.

Thus, in this non-limiting example, 640 CDS values are generated in approximately 30 microseconds, i.e., one CDS value for each CDS circuit of the 640 circuits. The 640 CDS values held by the 640 sample and hold circuits 406 (i.e., one CDS value for each sample and hold circuit) may then be read out by the column multiplexer 416 during the 30 microseconds allocated to the subsequent CDS operation performed on each of the imaging pixels of the row being operated on. The column multiplexer 416 may thus operate at high speed, with only 46 ns allocated to output a CDS value from each CDS circuit.

The method of operation of the imager 400 described above may be implemented in various modes. One mode of operation is referred to herein as full cycle integration. In full cycle integration, two CDS operations are performed on each imaging pixel of a row prior to moving on to a second row of the imaging array. For example, the operation of the imager may begin by performing a first CDS operation on each imaging pixel in row 1 of the imaging array. The first CDS operation for each imaging pixel may involve sampling an end-of-integration value and a subsequent hard reset value, both values of which are taken from a first integration cycle of that imaging pixel. The difference between the sampled end-of-integration value and the sampled subsequent hard reset value may then be calculated. Each imaging pixel of the first row may then begin a second integration cycle. A second CDS operation may then be performed on each imaging pixel of row 1 by sampling a hard reset value and a subsequent start-of-integration value for each imaging pixel, and then taking the difference therebetween.

In full cycle integration, operation on a second row of the imaging array (e.g., row 2) then begins after the two CDS operations described above have been performed on the imaging pixels of row 1. As with the processing of the imaging pixels of row 1, the processing of the imaging pixels of row 2 may involve performing a first CDS operation on each imaging pixel of row 2 by sampling an end-of-integration value of each imaging pixel in row 2 and a subsequent hard reset value of each imaging pixel in row 2, both values of which are taken from a first integration cycle of the imaging pixels in row 2. Subsequently, each imaging pixel in row 2 may then begin a second integration cycle. A second CDS operation may then be performed on each imaging pixel of row 2 by sampling a hard reset value and a subsequent start-of-integration value for each imaging pixel of row 2, both values of which are taken from a second integration cycle of the imaging pixels in row 2, and then taking the difference therebetween. Processing may then begin on the imaging pixels of a new row of the imaging array (e.g., row 3). The operation of the imager may repeat in this manner until all the rows of the imaging array have been processed once, thus completing a single frame cycle.

A second frame cycle is then initiated, starting, once again, with the first row (e.g., row 1). A first CDS operation during the new frame cycle is then performed on each imaging pixel in row 1, and may involve, as before, sampling an end-of-integration value of each pixel and a subsequent hard reset value. The CDS value produced from these two sampled values will correspond to the same integration cycle as the second CDS value produced for each imaging pixel of row 1 during the first frame cycle. Thus, two CDS operations are performed on each imaging pixel of the array within a same integration cycle of each imaging pixel, with the integration period of imaging pixel being approximately equal to the duration of a frame cycle of the imager.

A second CDS operation is then performed on each imaging pixel of row 1 during the second frame cycle. This second CDS operation may correspond to a third integration cycle of the imaging pixels in row 1, and may involve sampling a hard reset value and a subsequent start-of-integration value for each imaging pixel in row 1, and then taking the difference therebetween. Processing may then return to row 2, and the process may continue in this manner.

An alternative to full cycle integration is partial cycle integration, which may be, for example, half cycle integration, quarter cycle integration, or any suitable part of a full frame cycle. An example of half cycle integration is now given for purposes of illustration, and it should be appreciated that other types of partial cycle integration may be alternatively employed. Also, for purposes of this non-limiting example, it will be assumed that an imaging array includes 100 rows of imaging pixels (e.g., rows 1-100), although again it should be appreciated that half cycle integration is not limited to being applied on imaging arrays having 100 rows.

Half cycle integration may begin by performing a first "type" of CDS operation on each imaging pixel of row 1 (referred to in this non-limiting description of partial cycle integration as "Type 1"). The "type" of CDS operation as used in the context of this explanation of partial cycle integration relates to the sample values used for the CDS operation. The Type 1 CDS operation involves sampling an end-of-integration value and a subsequent hard reset value for an imaging pixel, both values of which are taken from a first integration cycle of that imaging pixel. The difference between the sampled end-of-integration value and the sampled subsequent hard reset value may then be calculated to produce a first CDS value. The first CDS value of each imaging pixel of row 1 may then be sent, for example, to a respective sample and hold circuit. Column multiplexer 416 may then form a serial data stream of the first CDS values of the imaging pixels of row 1.

Next, a second "type" of CDS operation (referred to herein as "Type 2") may be performed on the imaging pixels of row 51, as it will be appreciated that fifty rows separate row 1 from row 51, and in this non-limiting example fifty rows is half of the 100 rows of the imaging array. The Type 2 CDS operation involves sampling a hard reset value and a subsequent start-of-integration value for each imaging pixel of row 51, and then taking the difference therebetween. The resulting CDS values may then be sent, for example, to respective sample and hold circuits. Column multiplexer 416 may then form a serial data stream of these CDS values.

Next, a Type 1 CDS operation may be performed on each imaging pixel of row 2 of the imaging array 410, by sampling an end-of-integration value and a subsequent hard reset value, both values of which are taken from a first integration cycle of that imaging pixel. The difference between the sampled end-of-integration value and the sampled subsequent hard reset value may then be calculated. The first CDS value of each imaging pixel of row 2 may then be sent, for example, to a respective sample and hold circuit. Column multiplexer 416 may then form a serial data stream of the first CDS values of the imaging pixels of row 2.

Next, a Type 2 CDS operation may be performed on the imaging pixels of row 52, by sampling a hard reset value and a subsequent start-of-integration value for each imaging pixel of row 52, and then taking the difference therebetween. The resulting CDS values may then be sent, for example, to respective sample and hold circuits. Column multiplexer 416 may then form a serial data stream of these CDS values.

Thus, the process repeats by alternating between performing a Type 1 CDS operation on one row of imaging pixels and performing a Type 2 CDS operation on a row of imaging pixels separated by half of the imaging array (i.e., rows that are fifty rows apart in this non-limiting example) from the row on which the Type 1 CDS operations were performed. Thus, the Type 1 CDS operation and Type 2 CDS operation for any given imaging pixel of the array of imaging pixels are separated in time by the time required to process half the rows of the imaging array (i.e., half a frame period). A frame cycle is completed when both a Type 1 CDS operation and a Type 2 CDS operation are performed on each row of imaging pixels.

Once a first frame cycle is completed, by performing a Type 1 and Type 2 CDS operation on each of the rows of imaging pixels, a second frame cycle may be performed in the same manner as the first frame cycle. The Type 2 CDS value of each imaging pixel from the first frame cycle may then be combined with the Type 1 CDS value of the same imaging pixel from the second frame cycle to produce a resulting value representing an amount of integrated charge on an integration node of that imaging pixel during the time between the Type 2 CDS operation from the first frame cycle of that imaging pixel and the Type 1 CDS operation from the second frame cycle. In this non-limiting example, the integration time of each imaging pixel (i.e., the time between the Type 2 CDS operation in the first frame cycle and the Type 1 CDS operation in the second frame cycle) is equal to 50 row periods, which is therefore equal to one half of a frame period. The value of the Type 2 CDS operation for the first frame cycle for each imaging pixel may be combined with the value of the Type 1 CDS operation for the second frame cycle for each imaging pixel to produce a resulting value representing the amount of integrated charge on the integration node of that imaging pixel during the integration time of the integration cycle of the imaging pixel, such as by using Eq. 1, previously described, or any other suitable manner of combination.

It should be appreciated that other modes of operation of processing output signals from imaging pixels in an array are possible, and various aspects of the invention are not limited to any particular mode of operation. For example, the processing of output signals of imaging pixels in the imager 400 need not proceed on a row-by-row basis. Rather, any suitable subset of imaging pixels of the imager 400 may be operated on at a given time. Also, according to some embodiments, only a single imaging pixel of the imager 400 may be operated on at a given time. Also, it should be appreciated that the non-limiting example described above for the timing of operations within a 480×640 array of imaging pixels may apply regardless of whether the imager in that non-limiting example is operated in full cycle integration or partial cycle integration.

Figure 5:
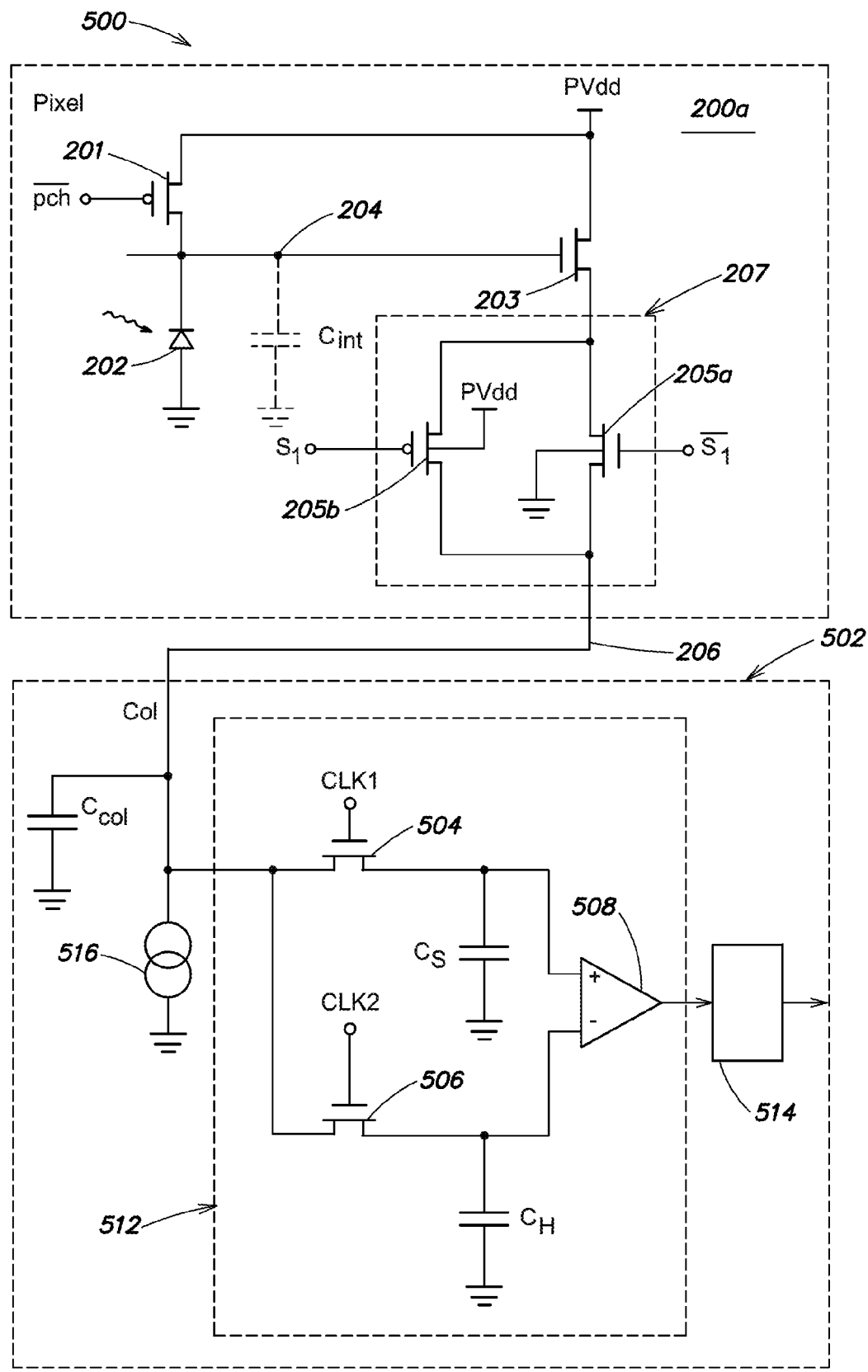
FIG. 5 is a CDS circuit for performing multiple CDS operations on a MOS imaging pixel, such as imaging pixel 200a of FIG. 2A, according to one embodiment.

FIG. 5 illustrates an example of column and termination processing circuitry for a single column of the imager 400.

For purposes of illustration, the column and termination processing circuitry is illustrated as being connected to a single imaging pixel of that column, and it should be appreciated that the other imaging pixels within the column are also connected to the same column termination and processing circuitry. The illustrative imaging pixel for purposes of this non-limiting example is pixel 200a. However, other pixel types (e.g., pixels 200b or 200c, or any other pixel) may alternatively be used.

As shown, the circuit 500 includes column and termination processing circuitry 502 comprising a CDS circuit 512. The CDS circuit 512 comprises input transistors 504 and 506, controlled by respective clock signals, CLK1 and CLK2. When the clock signals CLK1 and CLK2 are applied to turn on transistors 504 and 506, a signal may be stored on one of the capacitors $C_S$ or $C_H$. A differencing circuit 508 may then operate on the values stored on capacitors $C_S$ and $C_H$, to produce a CDS value which may be sent to a sample and hold circuit 514. The output of the sample and hold circuit may be sent to column multiplexer circuitry, or any other suitable circuitry. Also, it should be appreciated, as described previously, that the sample and hold circuit 514 may be described equally well as being part of the CDS circuit 512, rather than being distinct from it.

At the beginning of the integration cycle of imaging pixel 200a, the complementary switch 207 may be turned on, connecting the source of source follower transistor 203 to column line 206 and load 516 on the column line. In the non-limiting example of FIG. 5, the load 516 is illustrated as a current source. However, other types of loads could be used. The column line 206 can also include a column capacitance $C_{e01}$, which may filter high frequency noise from the column line 206, and which may take any suitable form and value.

The signal $\overline{pch}$ may then be asserted to put the imaging pixel 200a into its hard reset state. CLK2 may then be turned on briefly to capture a value Vh1 of the integration node voltage in the hard reset state on capacitor $C_H$. The input signal $\overline{pch}$ may then be released (e.g., allowed to assume a high value) to place the imaging pixel in the start-of-integration state. CLK1 may then be briefly turned on to capture the start-of-integration level Vs on capacitor $C_s$. The complementary switch 207 may then be turned off.

The differencing circuit 508, illustrated in the non-limiting example of FIG. 5 as a differential amplifier, may then generate a CDS value by subtracting the sampled hard reset value Vh1 from the sampled start-of-integration value Vs. The CDS value may then be stored in any suitable manner, e.g., in a sample and hold circuit 514 taking any suitable form. Sample and hold circuit 514 may then provide the CDS value to additional circuitry for further processing. For example, according to one embodiment, the CDS value may be provided from the sample and hold circuit 514 to an amplifier to produce an amplified version of the CDS value, and then to a column multiplexer, and then to an A/D converter to create a digital version of the amplified CDS value, which may be stored for later processing. The A/D converter may be on-chip or off-chip, as the various aspects of the invention are not limited in this respect. However, it should be appreciated that this is just one non-limiting example of the types of processing that can be performed on the CDS values taken from the sample and hold circuit 514. Other types of processing are also possible.

The complementary switch 207 may then be turned off as the photodiode 202 generates an optical current integrated on the integration node 204. The integration may occur for 20 milliseconds, 30 milliseconds, 40 milliseconds, or any other suitable duration of an integration period. At the end of the integration period of imaging pixel 200a, the complementary switch may once again be turned on. The end-of-integration value Ve of integration node 204 may be captured on capacitor $C_S$ by briefly turning on CLK1. The precharge transistor 201 may then be turned on by providing a low value of the input signal $\overline{pch}$, putting the imaging pixel back into its hard reset state. The value Vh2 of this second occurrence of the hard reset state during the integration cycle may be captured on capacitor $C_H$ by briefly turning on CLK2. The complementary switch may then be turned off.

The differencing circuit 508 may then generate a second CDS value, by subtracting the sampled value Vh2 of the second occurrence of the hard reset state from the sampled end-of-integration value Ve. This CDS value may be stored in sample and hold circuit 514, and later read out of sample and hold circuit 514. As described above in connection with the first CDS operation, the second CDS value taken from sample and hold circuit 514 may be provided to additional circuitry for further processing, e.g., amplification, column multiplexing, conversion to a digital signal, storage off-chip, or any other suitable type of processing.

As previously mentioned, the first and second CDS values may then be processed in combination to produce a resulting CDS value. For example, the operation previously shown in Eq. 1 may be performed, for example, by a summing circuit, a computer processor, a field programmable gate array (FPGA), or any other suitable structure.

Figure 6:
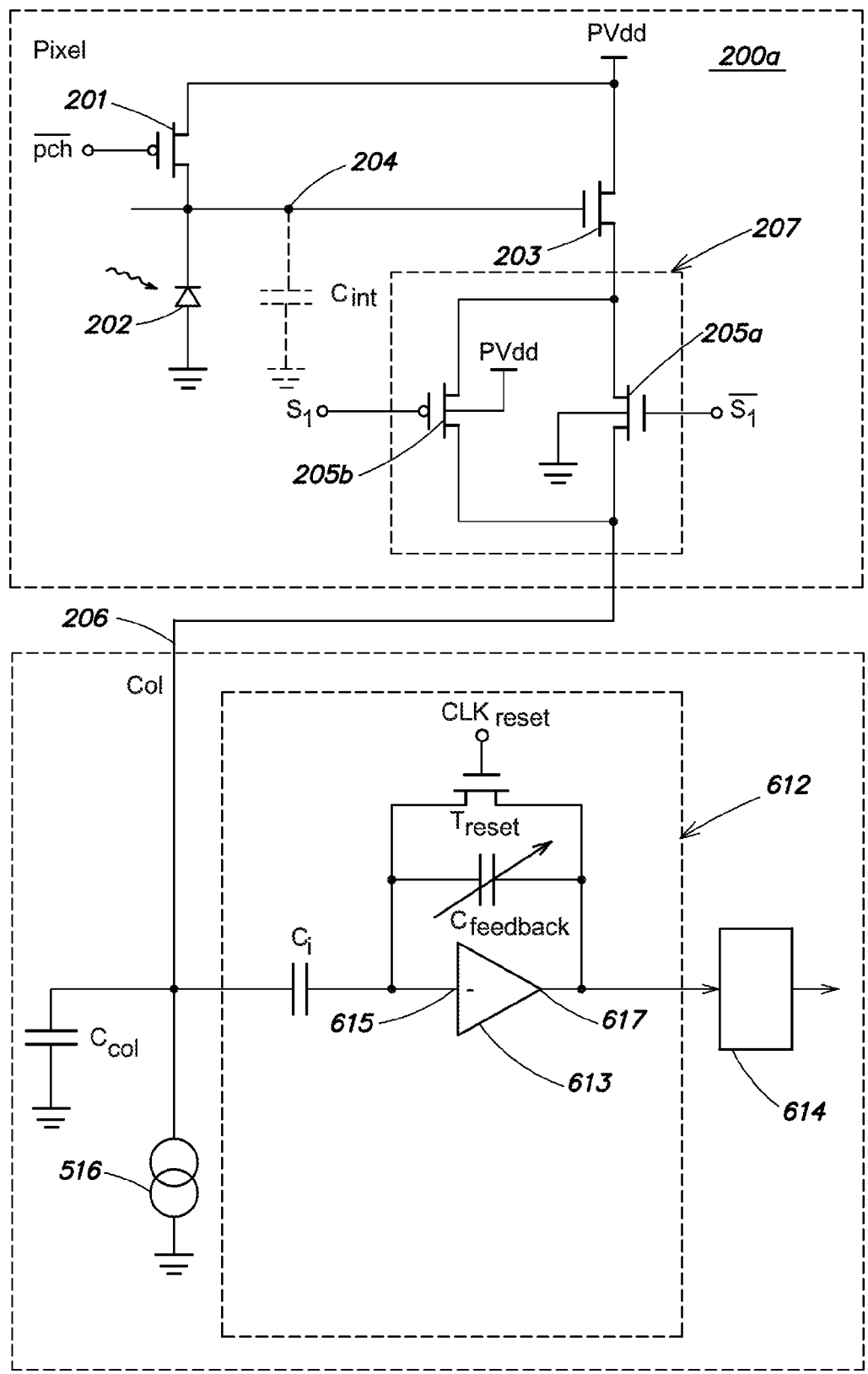
FIG. 6 is an alternative CDS circuit to that shown in FIG. 5, implementing a charge amplifier with an input capacitor and a feedback capacitor, according to one embodiment.

According to some embodiments, a CDS circuit for performing CDS operations on an output signal of an imaging pixel also provides amplification capabilities. FIG. 6 illustrates an example. It should be appreciated that the circuitry of FIG. 6 can be used in connection with an imaging array (e.g., as part of the column and termination processing circuitry of imager 400 in FIG. 4) or in combination with a single imaging pixel.

In the non-limiting example of FIG. 6, the CDS circuit 612 comprises a single-ended charge amplifier having an input capacitor $C_i$, a gain stage 613, a feedback capacitor $C_{feedback}$, and a reset transistor $T_{reset}$. The gain stage 613 is an inverting gain stage. The charge amplifier 612 with input capacitor may effectively operate as a voltage amplifier, with the gain of the charge amplifier given by $-C_i/C_{feedback}$. As will be described further below, in some embodiments the feedback capacitor $C_{feedback}$ may be a variable capacitor. The output of the charge amplifier with input capacitor may be coupled to a sample and hold circuit 614, or to any other suitable type of circuitry.

Figure 7:
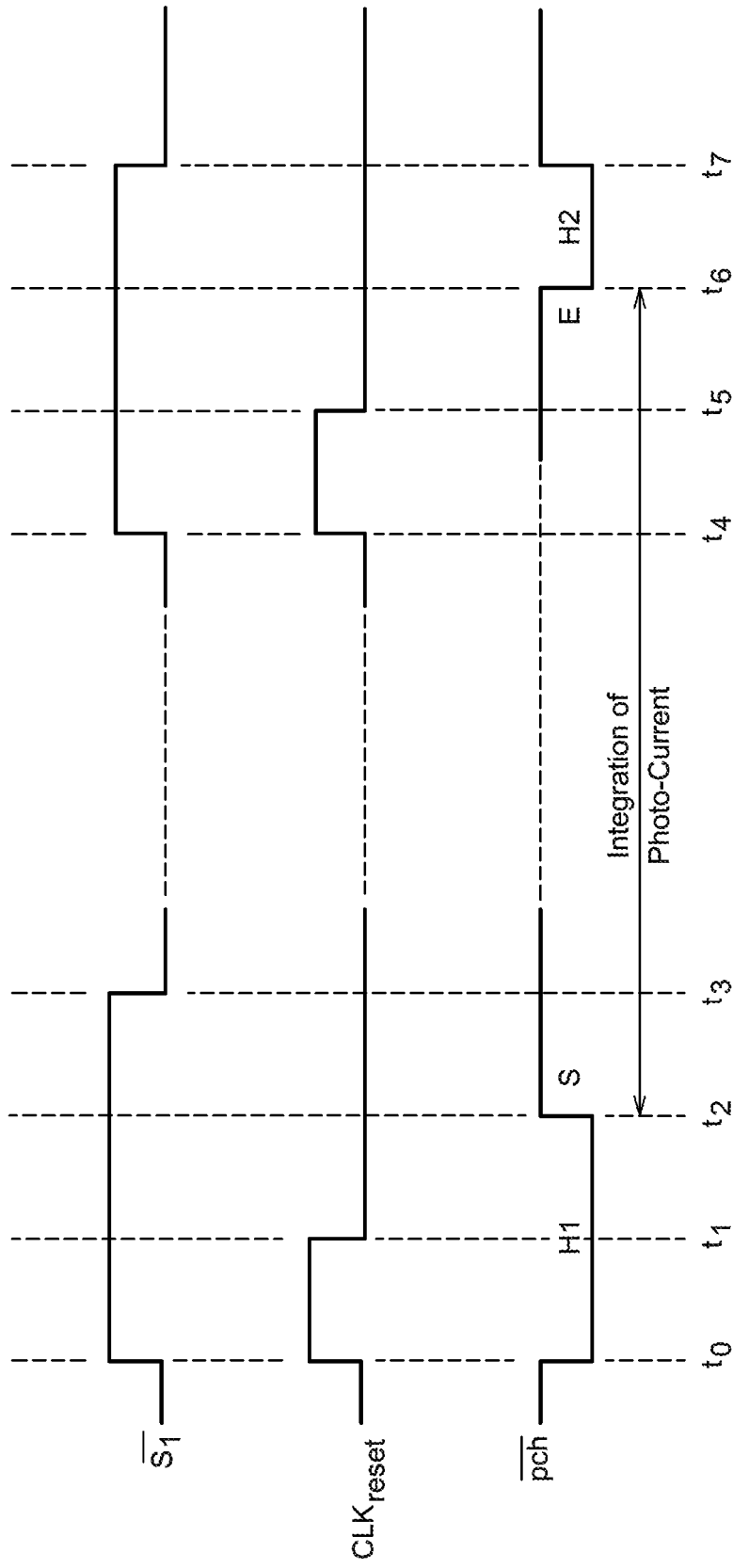
FIG. 7 is a timing diagram of some of the circuit signals in the circuit of FIG. 6.

One mode of operation of the circuit shown in FIG. 6 can be understood by reference to the timing diagrams of FIG. 7. At the beginning of an integration cycle of imaging pixel 200a, shown as time $t_o$ in FIG. 7, complementary switch 207 may be turned on by applying a high value of the input signal $\overline{S1}$, and therefore a low value of the input signal S1, which, as mentioned, is the logical opposite of $\overline{S1}$. The precharge transistor 201 may then be turned on by applying a low value for $\overline{pch}$, placing the imaging pixel into a hard reset state H1 as shown previously in FIG. 3. The reset clock $CLK_{reset}$ may go high, turning on the reset transistor $T_{reset}$, thereby short circuiting the output terminal 617 of gain stage 613 to the input terminal 615 of gain stage 613. Because complementary switch 207 is on, the hard reset value of the integration node 204 is output, or sampled, onto the column line 206. In this state, the input capacitor $C_i$ stores a value $Vh1-GS_{off}$ equal to the sampled hard reset value minus the offset value $GS_{off}$ of gain stage 613.

The input $CLK_{reset}$ to reset transistor $T_{reset}$ may then be released (i.e., assume a low value), as shown at time $t_1$ in FIG. 7, establishing a capacitance $C_{feedback}$ between the input terminal 615 of gain stage 613 and the output terminal 617. The voltage on the output terminal 617 of gain stage 613 may then respond to changes in the voltage on column line 206 by changing in a manner such that the voltage on the input terminal of gain stage 613 remains approximately constant. The precharge transistor 201 may then be turned off by applying a high signal for $\overline{pch}$ at time $t_2$ shown in FIG. 7, such that the integration node 204 transitions from a hard reset state (shown by H1 in FIG. 7) to a start-of-integration state (shown by S in FIG. 7).

If, as shown in FIG. 7, complementary switch remains on at time $t_2$ because $\overline{SI}$ remains high, the start-of-integration voltage of integration node 204 will be sampled to column line 206. Thus, the voltage applied on the column line 206 to input capacitor $C_i$ will change by an amount equal to the difference between the sampled hard reset value Vh1 and the sampled start-of-integration value Vs. Accordingly, the voltage at the output terminal 617 of gain stage 613 will change by the same amount, multiplied by $-C_i/C_{feedback}$, so that the voltage at the input terminal 615 to gain stage 613 will remain approximately constant. The voltage at the output terminal 617 of the gain stage 613 will thus change to ($GS_{off}$+gain*(Vh1−Vs)), where gain=$-C_i/C_{feedback}$. The output of the gain stage 613 may then be provided to sample and hold circuit 614, or any other suitable circuitry, for example to be stored, amplified, converted to a digital signal, etc. When the output value of gain stage 613 has been read out, the complementary switch 207 may be turned off at time $t_3$ by providing a low value of input signal $\overline{SI}$.

Integration of photocurrent on the integration node 204 may begin at time $t_2$ when the precharge transistor 201 is turned off, and may continue for the integration period, ranging from $t_2$ to $t_6$. At time $t_4$, near the end of the integration period, the reset transistor $T_{reset}$ may be turned on by providing a high value of $CLK_{reset}$, thus short circuiting the output terminal 617 of gain stage 613 to the input terminal 615. The voltage at the input terminal 615 and the output terminal 617 of gain stage 613 is then $GS_{off}$. Also at time $t_4$, the complementary switch 207 may be turned on by providing a high value of signal $\overline{SI}$. Thus, the end-of-integration value Ve on integration node 204 is read out to column line 206.

At time $t_5$, $CLK_{reset}$ may go low, turning off reset transistor $T_{reset}$, and thereby establishing a capacitance between the input terminal 615 and the output terminal 617 of the gain stage 613. The precharge transistor 201 may then be turned on at time $t_6$ by sending $\overline{pch}$ low, thus placing the imaging pixel 200a into a second hard reset state (shown as H2 in FIG. 7) during the integration cycle, and outputting a sampled value Vh2 of the integration node 204 in hard reset to the column line 206. Because complementary switch 207 remains on, the voltage on output terminal 617 to gain stage 613 may change so as to keep the voltage on the input terminal 615 of gain stage 613 approximately constant. The output terminal 617 of gain stage 613 will therefore change to ($GS_{off}$+gain*(Ve−Vh2)), where gain=$-Ci/C_{feedback}$. The voltage on the output terminal 617 (i.e., ($GS_{off}$+gain*(Ve−Vh2))) may then be provided to sample and hold circuit 614. At time $t_7$, the complementary switch 207 may be turned off and the precharge transistor may be turned off.

The two output signals from the charge amplifier with input capacitor thus obtained may then be processed in combination, for example by a summing circuit, an FPGA, a computer processor, or any other suitable structure. For example, the first output signal ($GS_{Off}$+gain*(Vh1−Vs)) may be added to the second output signal ($GS_{off}$+gain*(Ve−Vh2)) to obtain [gain*(Ve−Vs)+gain*(Vh1−Vh2)+2*$GS_{off}$]. This addition may be performed off-chip, or on-chip, as the various aspects of the invention are not limited in this respect. As mentioned previously, in some embodiments the quantity (Vh1−Vh2) is small (e.g., approximately zero), and can be ignored. $GS_{off}$ is a constant of the gain stage 613 which does not vary between integration cycles of the imaging pixel 200a, but may vary from column to column. The offsets $GS_{off}$ of each column amplifier can be removed, for example by capturing and storing digitally the offset value off-chip (for example, by capturing a dark image). The offset values can then be subtracted from the final result.

The circuit of FIG. 6 may reduce various noise sources because of its design. For example, the small number of clock signals used reduces charge injection and kTC noise introduced by the use of clock signals. Also, because the gain stage 613 can be single ended, as compared to the differential CDS circuit of FIG. 5, it can be implemented with a minimal number of transistors, thereby minimizing thermal noise.

As mentioned, the feedback capacitor $C_{feedback}$ of charge amplifier may be a variable capacitor in some embodiments. Varying the capacitance of $C_{feedback}$ can vary the gain provided by the charge amplifier 612 with input capacitor, which, as previously mentioned, is given by $-C_i/C_{feedback}$. The gain may be varied in response to environmental factors, such as lighting conditions (e.g., low light v. bright light scenarios), or for any other reason.

Figure 8:
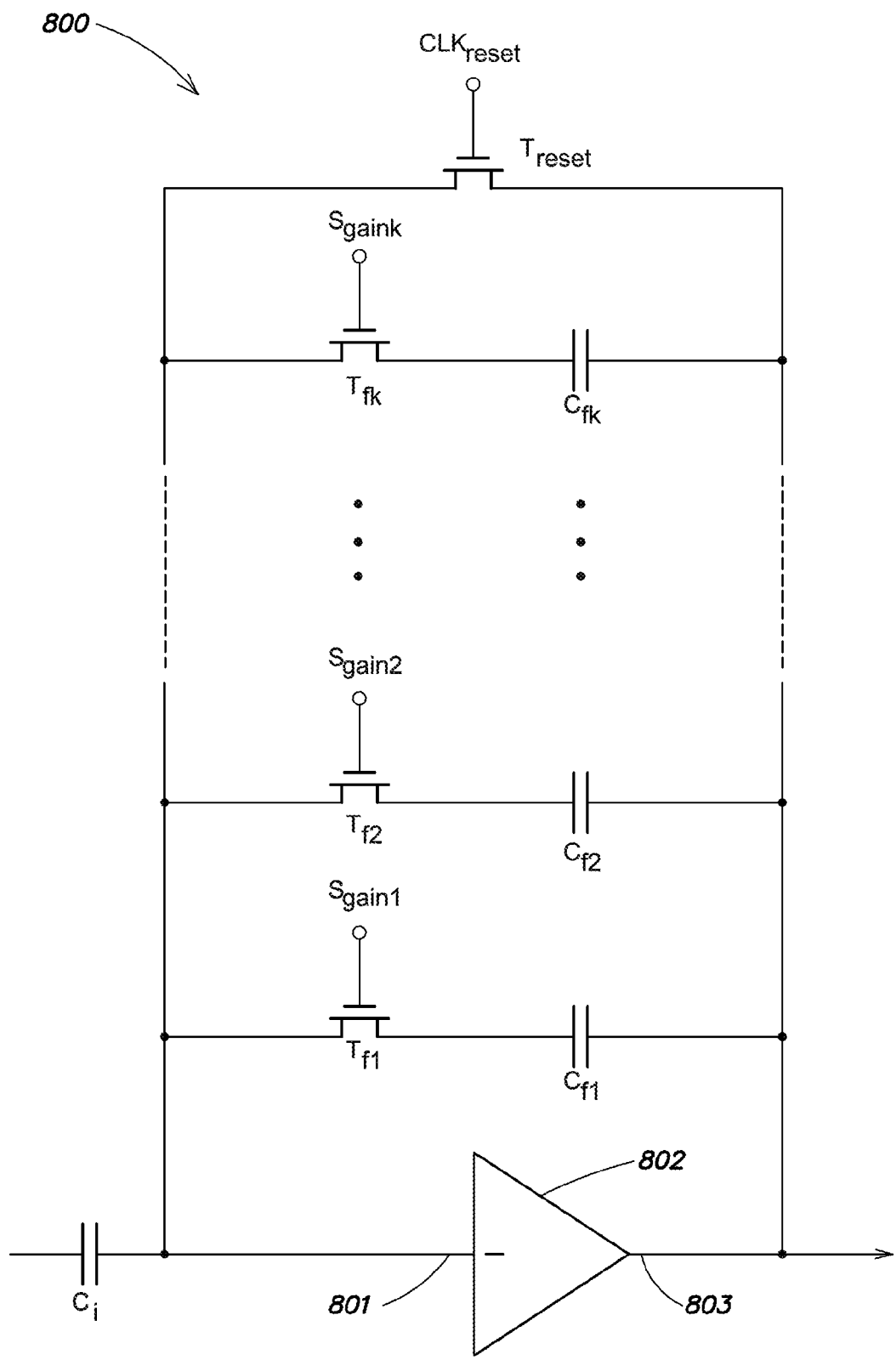
FIG. 8 is one implementation of a charge amplifier having an input capacitor and a variable feedback capacitance, according to one embodiment.

FIG. 8 illustrates one non-limiting example of a charge amplifier 800 having an input capacitor $C_i$ and a variable feedback capacitance, as might be used in the circuit of FIG. 6. The feedback capacitance comprises k capacitors ($C_{f1}$, $C_{f2}$, ..., $C_{fk}$) arranged in parallel between the input terminal 801 and output terminal 803 of gain stage 802. Gain stage 802 may be an inverting gain stage, and may be substantially the same as gain stage 613 in FIG. 6.

Each of the feedback capacitors $C_{f1}$, $C_{f2}$, ..., $C_{fk}$ may be coupled to the input terminal 801 of the gain stage 802 by a respective switch, $T_{f1}$, $T_{f2}$, ..., $T_{fk}$. Alternatively, the switches $T_{f1}$, $T_{f2}$, ..., $T_{fk}$ may be coupled between the respective feedback capacitor and the output terminal 803 of gain stage 802. The total feedback capacitance may thus be varied by turning on/off appropriate switches $T_{f1}$, $T_{f2}$, ..., $T_{fk}$ using their respective control signals $S_{gain1}$, $S_{gain2}$, ..., $S_{gaink}$. In the non-limiting example of FIG. 8, k different values of capacitance can be switched into or out of the feedback path, providing up to $2^k$ different values of gain for the charge amplifier 800 with an input capacitor.

Having thus described several aspects of at least one embodiment of this invention, it is to be appreciated various alterations, modifications, and improvements will readily occur to those skilled in the art. Such alterations, modifications, and improvements are intended to be within the spirit and scope of the invention. Accordingly, the foregoing description and drawings are by way of example only.

For example, the techniques and circuits described herein are not limited to use with 3T pixels, and are not limited to use with MOS imaging pixels. Rather, the techniques and circuits described herein may be capable of implementation in various types of imaging pixels. Also, it should be appreciated that the operation of several of the imaging pixels described herein has been described in terms of an "integration cycle." However, the makeup of an integration cycle, i.e., the number and order of events during the operation of the imaging pixel, may be varied while still allowing for use of the methods and circuits described herein. Therefore, it should be appreciated that the methods and circuits described herein may be used with various types of integration cycles of imaging pixels.

Also, it should be appreciated that the various aspects of the invention are not limited in its application to the details of construction and the arrangement of components set forth in the following description or illustrated in the drawings. The various aspects are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An apparatus comprising:
    an array of MOS imaging pixels comprising a first group of MOS imaging pixels;
    a first column line interconnecting the first group of MOS imaging pixels to form a first column of the array, the first column line being configured to receive a pixel output signal from each of the first group of MOS imaging pixels; and
    a first correlated double sampling (CDS) circuit comprising a charge amplifier having an input capacitor, the input capacitor of the charge amplifier coupled directly to the first column line to receive the pixel output signals from the first group of MOS imaging pixels,
    wherein the charge amplifier comprises a gain stage having an input terminal and an output terminal, wherein the input capacitor is coupled between the column line and the input terminal of the gain stage, and wherein the charge amplifier further comprises a feedback capacitor coupled between the input terminal of the gain stage and the output terminal of the gain stage.

2. The apparatus of claim 1, wherein the feedback capacitor is a variable capacitor.

3. The apparatus of claim 1, wherein the charge amplifier further comprises a switch in parallel with the feedback capacitor.

4. The apparatus of claim 3, wherein the switch is configured to short circuit the output terminal of the gain stage to the input terminal of the gain stage when the switch is closed.

5. The apparatus of claim 1, wherein the gain stage is a single-ended inverting gain stage.

6. The apparatus of claim 1, wherein the first group of MOS imaging pixels includes at least 100 MOS imaging pixels.

7. The apparatus of claim 1, wherein the array comprises m groups of MOS imaging pixels, one group of the m groups being the first group of MOS imaging pixels, and wherein the apparatus further comprises m column lines, one column line of the m column lines being the first column line, wherein each column line of the m column lines interconnects one group of the m groups of MOS imaging pixels to form a column, and wherein the apparatus further comprises m CDS circuits, one of the m CDS circuits being the first CDS circuit, each one of the m CDS circuits being coupled to one of the m column lines.

8. The apparatus of claim 7, wherein each one of the m CDS circuits has an output terminal for providing a CDS output signal, and wherein the apparatus further comprises at least one selection circuit comprising at least m input terminals, each one of the m input terminals of the at least one selection circuit being coupled to one of the output terminals of the m CDS circuits, and wherein the selection circuit further comprises an output terminal configured to provide one of the CDS output signals.

9. The apparatus of claim 8, wherein m is at least 100.

10. The apparatus of claim 9, wherein the first group of MOS imaging pixels comprises at least 100 MOS imaging pixels.

11. The apparatus of claim 10, wherein the first group of MOS imaging pixels comprises 480 imaging pixels.

12. A method of processing output signals of an array of MOS imaging pixels arranged in n rows and m columns, the method comprising:
    performing m first correlated double sampling (CDS) operations, one CDS operation of the m first CDS operations being performed on an output signal of each one of m MOS imaging pixels, the m first CDS operations producing m first CDS values;
    multiplexing the m first CDS values to produce a serial data stream of the m first CDS values;
    performing m second CDS operations, one CDS operation of the m second CDS operations being performed on the output signal of each one of the m MOS imaging pixels, the m second CDS operations producing m second CDS values, the m second CDS operations being part of a same integration cycle as the m first CDS operations; and
    multiplexing the m second CDS values to produce a serial data stream of the m second CDS values.

13. The method of claim 12, wherein the m MOS imaging pixels form at least a portion of a first row of the n rows.

14. The method of claim 13, wherein performing each of the m first CDS operations involves sampling a first pair of values of the output signal of one of the m MOS imaging pixels, the first pair of values including a first occurrence of a reference signal, and wherein performing each of the m second CDS operations involves sampling a second pair of values of the output signal of one of the m MOS imaging pixels, the second pair of values including a second occurrence of the reference signal.

15. The method of claim 14, wherein the reference signal is a hard reset value of the output signal of the one of the m MOS imaging pixels.

16. The method of claim 15, wherein performing the m first CDS operations comprises sampling a first occurrence of the hard reset value of the output signal of each MOS imaging pixel of the m MOS imaging pixels and sampling a start-of-integration value of the output signal of each MOS imaging pixel of the m MOS imaging pixels.

17. The method of claim 16, wherein performing the m first CDS operations further comprises subtracting the first occurrence of the hard reset value of the output signal of each MOS imaging pixel of the m MOS imaging pixels from the start-of-integration value of the output signal of the same MOS imaging pixel of the m MOS imaging pixels to produce the m first CDS values.

18. The method of claim 17, wherein performing the m second CDS operations comprises sampling an end-of-integration value of the output signal of each MOS imaging pixel of the m MOS imaging pixels and sampling a second occurrence of the hard reset value of the output signal of each MOS imaging pixel of the m MOS imaging pixels.

19. The method of claim 18, wherein performing the m second CDS operations further comprises subtracting the second occurrence of the hard reset value of the output signal of each MOS imaging pixel of the m MOS imaging pixels from the end-of-integration value of the output signal of the same MOS imaging pixel of the m MOS imaging pixels to produce the m second CDS values.

20. The method of claim 19, further comprising subtracting a first one of the m first CDS values corresponding to a first MOS imaging pixel of the m MOS imaging pixels from a first one of the m second CDS values corresponding to the first MOS imaging pixel.

21. The method of claim 20, wherein the m first CDS operations are performed in an analog domain.

22. The method of claim 21, wherein subtracting one of the m first CDS values from one of the m second CDS values is performed in a digital domain.

23. The method of claim 12, wherein the m first CDS operations are performed in an analog domain.

24. A method of processing a pixel output signal of a MOS imaging pixel having a pixel output terminal connected to an input capacitor of a charge amplifier, the charge amplifier further comprising a gain stage having a gain stage input terminal and a gain stage output terminal, the gain stage input terminal coupled to the input capacitor, the charge amplifier having a gain, the method comprising:
performing a first correlated double sampling (CDS) operation on the pixel output signal by
providing a first value of the pixel output signal to the input capacitor for a first period of time;
short circuiting the gain stage input terminal to the gain stage output terminal for at least a portion of the first period of time;
establishing a capacitance between the gain stage input terminal and the gain stage output terminal; and
providing a second value of the pixel output signal, differing from the first value by a first amount, to the input capacitor so that a signal is provided at the gain stage output terminal equal to the first amount multiplied by the gain of the charge amplifier.

25. The method of claim 24, further comprising performing a second CDS operation on the pixel output signal of the MOS imaging pixel by;
providing a third value of the pixel output signal to the input capacitor for a second period of time;
short circuiting the gain stage input terminal to the gain stage output terminal for at least a portion of the second period of time;
establishing a capacitance between the gain stage input terminal and the gain stage output terminal; and
providing a fourth value of the pixel output signal, differing from the third value by a second amount, to the input capacitor so that a signal is provided at the gain stage output terminal equal to the second amount multiplied by the gain of the charge amplifier.

26. The method of claim 25, wherein the first CDS operation and the second CDS operation are performed during a same integration cycle of the MOS imaging pixel.

27. The method of claim 26, wherein the first value of the pixel output signal corresponds to a reference voltage and the fourth value of the pixel output signal corresponds to the reference voltage.

28. The method of claim 27, wherein the first value of the pixel output signal is a first occurrence of the reference voltage during the integration cycle and the fourth value of the pixel output signal is a second occurrence of the reference voltage during the integration cycle.

29. The method of claim 27, wherein the third value of the pixel output signal is an end-of-integration value at least partially dependent on an amount of integrated photocurrent generated by a photodetector of the MOS imaging pixel.

30. The method of claim 29, wherein the second value of the pixel output signal corresponds to a start-of-integration value of the pixel output signal.

31. The method of claim 24, further comprising modifying an amount of the gain of the charge amplifier by varying a capacitance value of a variable capacitor of the charge amplifier.

32. The method of claim 31, wherein the variable capacitor is a feedback capacitor configured between the gain stage input terminal and the gain stage output terminal.

33. The method of claim 31, wherein the variable capaacitor is the input capacitor.

* * * * *

UNITED STATES PATENT AND TRADEMARK OFFICE
CERTIFICATE OF CORRECTION

| | | |
|---|---|---|
| PATENT NO. | : 8,072,525 B1 | Page 1 of 1 |
| APPLICATION NO. | : 12/141542 | |
| DATED | : December 6, 2011 | |
| INVENTOR(S) | : Bryan D. Ackland et al. | |

It is certified that error appears in the above-identified patent and that said Letters Patent is hereby corrected as shown below:

At column 23, claim 24, line 16, "signal by" should read --signal by:--.

At column 23, claim 25, line 31, "pixel by;" should read --pixel by:--.

At column 24, claim 33, lines 34-35, "capaacitor" should read --capacitor--.

Signed and Sealed this
Tenth Day of January, 2012

David J. Kappos
*Director of the United States Patent and Trademark Office*